(12) United States Patent
Yanovsky

(10) Patent No.: US 8,098,822 B2
(45) Date of Patent: Jan. 17, 2012

(54) SECURE COMMUNICATION SYSTEM AND METHOD USING SHARED RANDOM SOURCE FOR KEY CHANGING

(75) Inventor: Eli Yanovsky, Haifa (IL)

(73) Assignee: King Green Ltd., Haifa (IL)

( * ) Notice: Subject to any disclaimer, the term of this patent is extended or adjusted under 35 U.S.C. 154(b) by 853 days.

(21) Appl. No.: 10/520,274

(22) PCT Filed: Jul. 16, 2002

(86) PCT No.: PCT/IL02/00571
§ 371 (c)(1),
(2), (4) Date: Jan. 18, 2005

(87) PCT Pub. No.: WO03/009513
PCT Pub. Date: Jan. 30, 2003

(65) Prior Publication Data
US 2006/0067533 A1    Mar. 30, 2006

(30) Foreign Application Priority Data
Jul. 17, 2001   (IL) .......................................... 144369

(51) Int. Cl.
    *H04L 9/08* (2006.01)
(52) U.S. Cl. .......................... 380/260; 713/171; 380/278
(58) Field of Classification Search .................... 380/278
    See application file for complete search history.

(56) References Cited

U.S. PATENT DOCUMENTS

| | | | |
|---|---|---|---|
| 4,731,840 A | 3/1988 | Mniszewski et al. | |
| 5,253,294 A * | 10/1993 | Maurer | 380/264 |
| 5,375,169 A | 12/1994 | Seheidt et al. | |
| 5,414,771 A * | 5/1995 | Fawcett, Jr. | 380/44 |
| 5,586,185 A | 12/1996 | Shibata et al. | |
| 5,703,948 A * | 12/1997 | Yanovsky | 380/262 |
| 5,923,758 A | 7/1999 | Khamhara et al. | |
| 5,960,086 A * | 9/1999 | Atalla | 380/44 |
| 6,490,353 B1 * | 12/2002 | Tan | 380/37 |
| 7,627,116 B2 * | 12/2009 | Yanovsky | 380/46 |
| 2002/0156798 A1 | 10/2002 | Larue et al. | |

FOREIGN PATENT DOCUMENTS

| | | |
|---|---|---|
| EP | 0155762 | 9/1985 |
| GB | 2132860 | 7/1984 |
| WO | WO 00/67548 | 11/2000 |

OTHER PUBLICATIONS

Office Action Dated Jan. 16, 2006 From the Israeli Patent Office Re.: Application No. 144369.
Office Action Dated Oct. 23, 2006 From the Israeli Patent Office Re.: Application No. 144369.
Office Action Dated Mar. 26, 2008 From the Israeli Patent Office Re.: Application No. 144369.
Supplementary search report.

\* cited by examiner

*Primary Examiner* — Gilberto Barron, Jr.
*Assistant Examiner* — Simon Kanaan

(57) ABSTRACT

Apparatus for use by a first party for key management for secure communication with a second party, said key management being to provide at each party, simultaneously remotely, identical keys for said secure communication without transferring said keys over any communication link, the apparatus comprising: a datastream extractor, for obtaining from data exchanged between said parties a bitstream, a random selector for selecting, from said bitstream, a series of bits in accordance with a randomization seeded by said data exchanged between said parties, a key generator for generating a key for encryption/decryption based on said series of bits, thereby to manage key generation in a manner repeatable at said parties.

43 Claims, 10 Drawing Sheets

Fig. 5

| Area | BU in Memory | Transmitter | | Receiver | |
|---|---|---|---|---|---|
| | | Control Snt | BU Use | Control Rcv | BU Use |
| Steady | old | 'Old' | 'old' | Ignore | 'old' |
| Transient-2 | old | 'Old' | 'old' | 'Old' | 'old' |
| | | | | 'New' | 'new1' |
| Transient-1 | old | 'New' | 'new1' | 'Old' | 'old' |
| | | | | 'New' | 'new1' |
| Transient+1 | new | 'New' | 'new' | Ignore | 'new' |

Fig. 11

SECURE COMMUNICATION SYSTEM AND METHOD USING SHARED RANDOM SOURCE FOR KEY CHANGING

RELATED PATENT APPLICATION

This application is a National Phase Application of PCT/IL02/00571 having International Filing Date of 16 Jul. 2002.

BACKGROUND OF THE INVENTION

Randomness is a basic and well-known tool in many disciplines of science and technology and finds application in fields such as communications, data security, access-control, and processes based on chaos theory.

In some systems, such as frequency hopping based systems, there is a need for identical and simultaneous randomness at different remote locations. Furthermore, a random result employed at the remote locations is preferably confidential and unknown to an unauthorized party. Examples include (i) secret key data encryption methods, in which both communicating parties need to have the same secret key, which is typically a random key;

(ii) remote access control, in which a distant operator needs to have the same password as that installed in a 'machine' to be accessed—this password is preferably a random password; and (iii) chaos processes which are executed remotely.

Encryption, in particular, is a necessary tool in electronic communications, wherein data of highly sensitive content is propagated through public networks. An ideal data security system using encryption technology as the principle tool should be able to provide the following three features:

1) provide identification and authentication of the data source and destination, 2) prevent unauthorized access to the data, and 3) protect the data from unauthorized tampering.

Generally speaking, encryption involves turning a meaningful series of data into a meaningless and apparently random sequence. Recovery of the original meaningful sequence is only possible with certain additional information. Certain encryption systems allow a receiver of data to determine that the data has been altered following encryption. Likewise, certain ways of using encryption keys allows for electronic signature of the data, so that the receiver of the data is able to be sure who the sender is, and suitable use of the electronic signature allows both parties to be sure of the other party.

The vast majority of encryption systems include two components, an algorithm, or encryption method, and a key, which, generally speaking, contains values to be used at various steps in the algorithm.

For the most part, the algorithms used in encryption systems are known. The exceptions are in certain government applications, and generally it is very inadvisable for an encryption system to rely on the secrecy of the algorithm. Thus, the security of most encryption systems lies with the secrecy of the key.

Generally speaking, encryption methods may be classified into groups as follows:

symmetric (secret key) encryption,—as opposed to asymmetric (public key) encryption, random (one time pad) encryption,—as opposed to algorithmic encryption, block enciphering, as opposed to stream enciphering, etc.

However, in each case, in the broad sense outlined above, in order to obtain a closed solution having all features of data security, there is the need to share secret information in order for the system to work Approaches for breaking into encryption systems to allow unauthorized access to the data, may be grouped into four. They are:

1. Reverse engineering
2. Cryptanalysis and mathematical methods,
3. Tape and retransmit,
4. Exploitation of human weakness.

The above approaches are often used in combination and in general, secure encryption has to be based on the assumption that any key, after being used for a certain amount of time, will tend to become known. Secure communication thus requires frequent changes to the key. In particular, as available computing power is growing, key lifetime is becoming shorter and shorter.

The process of regularly changing keys is known as key management, and key management is thus becoming a more and more important part of encryption and secure communication.

When using symmetric encryption systems, the exact same key is needed at both parties and thus key management involves the transfer of the key from one party to another.

When using asymmetric systems, key changeover is simpler. If one party changes his key, then internally he changes his private key, which is needed for reading any messages. He then only has to transmit the public key, which does not need to be kept secret. The public key is needed for encryption but is completely useless for decryption of the message. However, even in the case of asymmetric systems, there remains the issue of changeover occurrence. If one party starts to use the key before the other, then there will be a short period of unintelligible conversation. Furthermore, when one party receives a new key, he needs to be sure that the key he has received indeed comes from the other party and not from an eavesdropper. Generally, asymmetric systems use a system of mutually exchanging keys so that they are able to rely on each other. Nevertheless, difficulties remain, for example where authorized parties lose synchronization at the crucial moment of key exchange.

One approach in key management involves the use of a trusted third party, a so-called certificate authority. The certificate authority manages key changes for all the users. However, the use of a certificate authority does not actually solve any of the key management problems as such, it simply moves them all on one stage.

Thus, modern secure communication essentially is a question of key management, and the key management issue may be summed up by the following statements:

Communication security relies on secret information (the key).

A secure communication system may be regarded as a chain, and the level of security provided is that of the weakest link in that chain.

The more a key has been used the less secret it is.

Computing power increases at a steady rate, and as that power increases, so does the lifetime of the key decrease, thus necessitating more and more frequent changing of the key or the use of computationally more complex keys.

The regular exchange of keys necessitated by the above must be carried out without giving any information away to eavesdroppers.

Current key management systems include two major categories, the master key category and the public key category. The master key category preferably utilizes a key hierarchy in which heavy master keys are used for secure transfer of session keys, which session keys are used for the encryption of the bulk of the communicated data. The approach fails to solve in depth any of the problems discussed above since weaknesses associated with the lower level session keys are simply transferred to the higher level master keys. Whilst it is true that it is harder for an eavesdropper to deal with the higher level keys the approach does not provide any conceptual increase in security level since the higher level keys are not generally changed.

The public key approach to key management is simply to exchange public keys at intervals. In general the public key is a computationally intensive key to generate, and is regarded as being computationally intensive for decryption and thus the keys are not changed regularly. However, it should be borne in mind that the computational effort to break the key is important only to one out of the four methods for breaking the system, and indeed is of no importance at all to the reverse engineering and human weakness approaches or to hacking, in which the eavesdropper attempts to enter a computer system and obtain the keys. Thus, failure to carry out regular key exchange even in public key encryption systems is here regarded as a mistake.

As mentioned above, the public key system relies for the user identification part of the key transfer on a mutual key transfer with each side using his private key to sign the message. The identification step may be carried out with the help of a certificate authority acting as a trusted third party. However, in either case, the computational complexity of generating new keys together with the identification needs, management effort and administration tasks discourage effective key management practice and key exchange using the public key system boils down in practice to using a fixed key.

In order for a key to be secure, it requires an element of unpredictability. For example with the RSA public key, which is the multiple of two large prime numbers, if the prime numbers themselves, from which the key is built are in any way predictable, the RSA key is not secure.

Keys or key systems for encrypted data as described above, preferably rely on random processes for their creation. Authorized parties to a given communication must have compatible keys. However it is preferable to avoid sending keys, both in order to avoid interception, and to make the encryption process itself simpler and faster. The sending of keys is especially risky in the case of symmetric key systems where the key transmitted is the key needed for decrypting the message. Also the sending of keys delays the communication process. Preferably, therefore, the ideal key management system should allow users to produce the same random key independently. If the key is to be generated using a random process, however, then the two parties cannot conventionally generate the same random process separately, because if it can be exactly repeated then it cannot be random. Indeed the ability to reproduce the process defies the definition of randomness, and no process that can be repeated may be truly random.

A particular environment in which encryption is important is the Internet. Increasingly, the Internet is becoming the forum for business and other transactions in which confidentiality is necessary. Generally, over the Internet, most users expect encryption to work substantially transparently, at the very least not to hold up communication. The communication itself takes place over an open channel in which data is passed from one node to another and may actually be stored on intermediate nodes where it can be accessed later by eavesdroppers. An efficient system of key management, which does not slow down communication and also does not leave keys lying around on intermediate Internet nodes, is therefore needed.

Current approaches for providing simultaneous availability of random results may be grouped into two general families of solutions:

(i) generating randomness at one party, and sending it to the other party; and (ii) using a pseudo random process at both parties, e.g., a PRNG (Pseudo Random Number Generator) which gives the same random bit stream as an output at both ends if fed by the same input seed.

The above approaches are limited because both the key and the seed may be intercepted by an unauthorized party. The latter approach is demonstrated by, for example, U.S. Pat. No. 5,703,948, in which a system and method are described, for transmitting encrypted messages between two parties, wherein the encrypting key is generated by two state machines, one at each party, which state machines are both identically initialized. The state machines dynamically produce changing keys, by using, each time, some randomly selected bits of a message as seeds for the next key. The machines at both ends are synchronized by using the same seed bits each time, thereby producing the same keys at both ends. Apparently, the parties have to worry about the confidentiality of the initial seed and of the dynamically changing seeds during the course of the message.

There is thus required a system of randomly setting encryption keys identically at remote locations wherein the random data for setting the keys, and certainly the keys themselves, are not available to an eavesdropper. It would further be advantageous if such a system were to include the other listed requirements of an encryption system, namely allowing for mutual identification between users and a way of recognizing whether data has been interfered with en route. A preferred system should also include a way of checking on synchronization and a way of restoring synchronization in the event of synchronization loss.

In the context of mutual identification and maintenance of synchronization, reference is made to the Byzantine agreement problem.

Two remote armies, A and B, approach from different directions to besiege a powerful city. Neither army alone is powerful enough to overcome the city and should it appear on the battlefield alone it will be destroyed. Only if both armies appear simultaneously and from opposite directions is there any chance of success.

The overall commander, located with army A, has to coordinate an attack, but has at his disposal dispatch riders as his only means of communication.

The overall commander thus sends a message to the commander of Army B, by dispatch rider, which conveys time of and directions for the intended attack. However, having sent the message by a courier, the commander of army A cannot be certain that the message has reached its destination, (and if it has, that it has not been tampered with on the way). Thus, logic dictates that he will not attack, due to his instinct for self-preservation.

Having received the message, the commander of Army B is faced with the same problem, he cannot be certain that the content of the message is real and that it indeed comes from his ally. It could be a false message sent by the enemy and intended to lure him to his destruction. Furthermore, he knows that commander A has an instinct for self-preservation which is no less real than his own. Thus he must assume that A will not attack and hence he too, does not attack.

Furthermore, he knows that his ally, the commander of army A, will be faced with the same dilemma when receiving his acknowledgement and is unlikely to launch an attack on the basis of this information. Army B, in any case sends back to Army A an acknowledgment message, of the time of and directions for of the attack. Army A receives the acknowledgement but also cannot be sure that the acknowledgement is genuine and has not been sent by the enemy to lure them to their destruction. Furthermore, A knows of B's instinct for self-preservation. Bearing this in mind, army A must assume that army B will not attack. The situation is not improved however many further rounds of acknowledgement or confirmation are carried out. That is to say, having sent the acknowledgment message, both army A and army B keep facing the same dilemma of not being able to assume that the other will attack and, as a result, an attack will never be launched.

The "Byzantine Agreement Problem", is a logical dilemma that is relevant when translated into modern communications, especially when considering for example, open communication modes such as the Internet, which are exposed to hackers, imposters etc. and to errors and breaks in communications.

The issues that this logical dilemma presents, and need to be solved are (i) synchronization; (ii) simultaneity; (iii) identification; and (iv) authentication.

At the basis of the problem lies the fact that at any given step, one party knows less than the other, and there is a lag between the knowledge of the parties (about the situation of one party in regard to the other party, and in their mutual understanding)

The Byzantine agreement problem thus raises the following issues, synchronization, simultaneity, identification and authentication. The root of the problem is that at any given leg of the communication procedure, one party leads and one party lags, even if by nanoseconds, thus leading to scope for dispute and for impersonation.

The depth of the problem may be demonstrated by illustrating two approaches that have been used in attempted solutions in the past.

1) Clock timing synchronization. Each party has an identically set clock. A parameter changes at predetermined clock settings. Unfortunately the two clocks cannot be set so accurately with respect to one another that no dispute occurs at any time. Even a difference of nanoseconds can lead to dispute over some of the data.

2) Synchronization by announcement. A parameter change is made upon receipt of a predetermined announcement. Unfortunately, this approach begs the very essence of the Byzantine agreement problem, since I do not know whether the other side has received the announcement, or whether it originates from a legitimate source at all.

There is thus a widely recognized need for, and it would be highly advantageous to have, a simple and practical way to produce identical ongoing randomness at separate and remote locations, that is confidential in nature and which enables a mode of communication, synchronization or authentication between two parties that is not vulnerable to the logical dilemmas of the Byzantine agreement problem, and which may provide a comprehensive solution to secure key management.

SUMMARY OF THE INVENTION

According to an aspect of the present invention there is provided a system and apparatus for utilization, for setting encryption keys, by remotely located parties, of a mutually remotely located random data generation process. Preferably, the remotely located random data generation process generates a large amount of random data and the two parties secretly share starting information telling them where to look initially for random data from the process. The parties each have identically set arrangements for using the current random data to select the next required random data from the process.

In an embodiment, the remotely located random data process preferably utilizes a plurality of individual random processes and a means for the parties to respectively select the same one of the plurality of processes at any given time. Data from previous processes is used subsequently to select new processes in such a way that the process selection remains confidential to anyone eavesdropping on the remotely located random process itself.

Moreover, the process following comprises feature that allow for correct working even in noisy and/or other less than perfect conditions. The system comprises a working synchronization feature for allowing the parties to be sure that they are in synchronization with each other and, when synchronization loss is detected, there is a resynchronization method which redirects each party to a same new random process. The unique synchronization technique and resynchronization features provide for a stable communication system that preferably overcomes the difficulties represented by the Byzantine agreement problem.

According to a first aspect of the present invention there is thus provided apparatus for use by a first party for key management for secure communication with a second party, the key management being to provide at each party, simultaneously remotely, identical keys for the secure communication without transferring the keys over any communication link, the apparatus comprising:

a datastream extractor, for obtaining from data exchanged between the parties a bitstream, a random selector for selecting, from the bitstream, a series of bits in accordance with a randomization seeded by the data exchanged between the parties, a key generator for generating a key for encryption/decryption based on the series of bits, thereby to manage key generation in a manner repeatable at the parties.

Preferably, the random selector is operable to use results of the randomization as addresses to point to bits in the datastream.

Preferably, the key generator is operable to generate a new key after a predetermined number of message bits have been exchanged between the parties.

Preferably, the predetermined number of message bits being substantially equal to a length in bits of the key.

The apparatus preferably comprises a control messager for sending control messages to the remote party, thereby to indicate to the remote party a state of the apparatus to enable the remote party to determine whether the remote party is synchronized therewith to generate an identical key.

The apparatus preferably comprises a synchronized state determiner, for determining from control messages received from a remote party whether the apparatus is synchronized therewith to generate an identical key.

The apparatus preferably further comprises a resynchronizer, associated with the synchronous state determiner, the resynchronizer having a resynchronization random selector for selecting, from a part of the bitstream previously used by the random selector, a series of bits in accordance with a randomization seeded by the data exchanged between the parties, in the event of determination of synchronization loss, thereby to regain synchronization.

Preferably, the series of bits is a series of bits previously used by the random selector.

Preferably, the control messager is operatively connected to the synchronous state determiner, thereby to include within the control messages a determination of synchronization loss.

Preferably, the control messager is operatively connected with the resynchronizer, to control the resynchronizer to carry out the selection in the event of receipt of a message from the remote party that the remote party has lost synchronization.

Preferably, the data communication is arranged in cycles, the part of the bitstream being exchangeable in each cycle.

Preferably, the cycle is arranged into sub-units, each the cycle having an exchange point at its beginning for carrying out the exchange.

Preferably, the messager is usable to exchange control messages with the remote party to ensure that a same bitstream part is used for resynchronization at both the parties.

Preferably, the messager is usable to vary a control message in accordance with a sub-cycle current at a synchronization loss event, thereby to control the remote party to resynchronize using a same bitstream part.

Preferably, the apparatus is operable to respond to messages sent by a remote party following the synchronization loss event, to revert to same the bitstream part as the message indicates that the remote party intends to use.

The apparatus preferably comprises circuitry for determining which of itself and the remote party is a transmitting party and being operable to control the synchronization when it is a transmitting party and to respond to control commands of the remote party when the remote party is the transmitting party.

Preferably, the synchronized state determiner comprises:
a calculation circuit for carrying out an irreversible calculation on any one of the bitstream, the randomization, the key and derivations thereof, and
a comparator for comparing a result of the calculation with a result received from the remote party,
thereby to determine whether the parties are in synchronization.

Preferably, the irreversible calculation comprises a one-way function.

Preferably, the system is operable to provide key management for a symmetric cryptography algorithm.

In a preferred embodiment, the apparatus is constructed modularwise such that the cryptography algorithm is exchangeable.

According to a second aspect of the present invention there is provided a system for providing key management between at least two separate parties, the system comprising
a primary bitstream for exchange between the parties,
and at each party:
a selector for randomly selecting, at predetermined selection intervals, parts of the primary bitstream to form a derived bit source, each selector being operable to use the derived bit source, in an identical manner, to randomize the selecting, and
a key generator for generating cryptography keys at predetermined key generating intervals using the derived bit source of a corresponding selection interval.

Preferably, the primary bitstream is obtainable as a stream of bits from a data communication process between the two parties.

Preferably, the bits in the primary bitstream are separately identifiable by an address, and wherein the selector is operable to select the bits by random selection of addresses.

Preferably, each selector comprises an address generator and each address generator is identically set.

Preferably, the system further comprises a controller for exchanging control data between the parties to enable each party to determine that each selector is operating synchronously at each party.

Preferably, the control data includes any one of a group comprising:
redundancy check data, and
a hash encoding result,
of at least some of the bits from the derived bit source.

Preferably, the control data includes any one of a group comprising:
redundancy check data, and
a hash encoding result,
of at least some of the bits of the randomization.

Preferably, the control data includes any one of a group comprising:
redundancy check data, and
a hash encoding result,
of at least some of the bits from the key.

Preferably, the control data includes any one of a group comprising:
redundancy check data of at least some of the addresses, and
a hash encoding result of at least some of the addresses.

A preferred embodiment further comprises at each party a resynchronizer operable to determine from the control data that synchronization has been lost between the parties and to regain synchronization based on a predetermined earlier part of the derived bit source.

A preferred embodiment further comprises at each party a resynchronizer operable to determine from control data exchanged between the parties that synchronization has been lost between the parties and to regain synchronization based on a predetermined earlier part of the derived bit source.

Preferably, the data communication process is arranged in cycles, the predetermined earlier part being exchangeable in each cycle.

Preferably, the cycles are arranged into sub-units, each the cycle having an exchange point at its beginning for carrying out the exchange of the predetermined earlier part of the derived bit source.

Preferably, the controller is usable to include in the control messages, data to ensure that a predetermined earlier part of the derived bit source of a same cycle is used for resynchronization at both the parties.

Preferably, the controller is usable to vary a control message in accordance with a sub-cycle current at a synchronization loss event, thereby to control the remote party to resynchronize using same the predetermined earlier part of the derived bit source.

A preferred embodiment is operable to respond to messages sent by a remote party following the synchronization loss event, to revert to same the predetermined earlier part of the derived bit source as the message indicates that the remote party intends to use.

According to a further aspect of the present invention there is provided a method of key management with at least one remote party, comprising the steps of:
sharing with the remote party a primary data stream,
using the primary data stream to form a randomizer,
selecting parts of the primary data stream using the randomizer to form a derived data source, and
using the derived data source to form cryptography keys at predetermined intervals.

Preferably, the primary data source is obtainable as a stream of bits from a communication process between the two parties.

Preferably, the primary data source comprises a stream of data bits divisible into data units and comprising selecting at random from the data bits of each data unit.

Preferably the bits in the data units are separately identifiable by addresses, and the method comprises selecting the bits by using the randomizer as an address pointer.

Preferably, selecting is carried out by using identically set pseudorandom data generation at each party, and using the derived data source as a seed for the pseudorandom data generation.

Preferably, the method further comprises exchanging control data between the parties to enable each party to determine whether they are operating synchronously with the other party.

Preferably, the control data includes any one of a group comprising:

redundancy check data of at least some of the derived data source, and a hash encoding result of at least some of the derived data source.

The method preferably comprises determining from the control data whether synchronization has been lost between the parties and, if so, regaining synchronization based on a predetermined earlier part of the derived data source.

The method preferably further comprises a step of exchanging the predetermined earlier part of the derived data source at predetermined intervals.

The method preferably further comprises:

determining a possibility of each party being at a different cycle at synchronization loss, and controlling the resynchronization to use a same predetermined earlier part of the derived data source at both parties.

The method preferably further comprises creating in advance a future cycle's predetermined earlier part of the derived data source for resynchronizing with a party that has already moved to such a cycle.

The method may be used to provide key management for a symmetric cryptography algorithm.

BRIEF DESCRIPTION OF THE DRAWINGS

For a better understanding of the invention and to show how the same may be carried into effect, reference will now be made, purely by way of example, to the accompanying drawings.

With specific reference to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 5 is a simplified diagram illustrating a random data production procedure comprising two consecutive random processes of the kind shown in FIG. 3.

FIG. 11 is a simplified diagram showing in tabular form a protocol for ensuring that parties successfully resynchronize, in particular allowing for the possibility that the parties may not be in the same resynchronization state.

DESCRIPTION OF A PREFERRED EMBODIMENT

Figure 1:
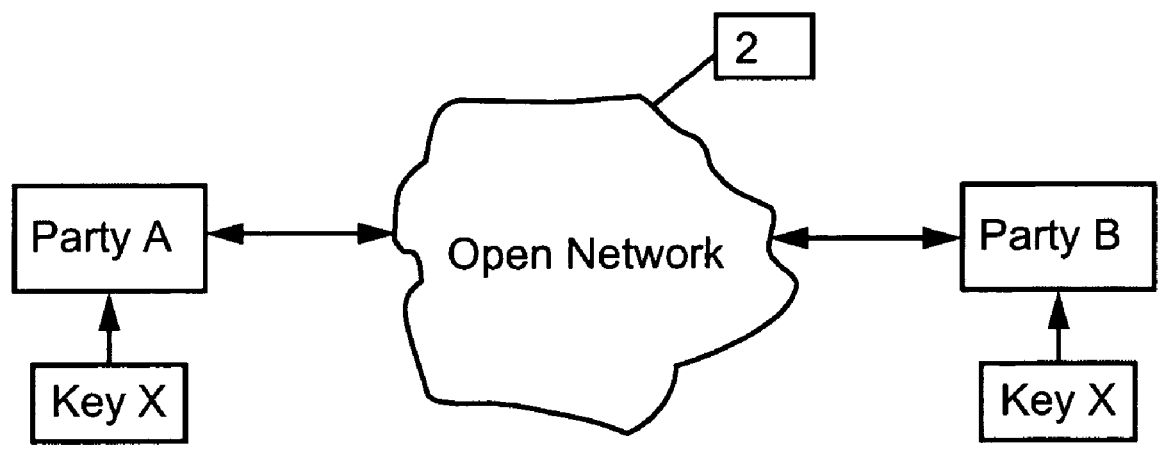
FIG. 1 is a generalized block diagram showing two parties communicating over an open network in accordance with a first embodiment of the present invention.

FIG. 1 is a simplified block diagram showing two users, Party A and Party B, communicating using a secure communication link over an open network 2 using an identical key, key x, generated by random processes, the key never having been transferred across any communication link, as will be explained in more detail below.

In the following, key management according to the present invention will be described with reference to symmetric encryption systems, which means that it requires an identical key for encryption and decryption at each of the parties to the communication. Possession of the key by an outsider allows an eavesdropper to read the message and also to alter messages as they pass by, the altered message appearing to the receiver as having been sent from the legitimate originator. Key management according to embodiments of the present invention allows the two parties to the communication to be in possession of the identical key without the key having been transferred in any way across any communication channel, the key nevertheless being the result of a random process.

Figure 2:
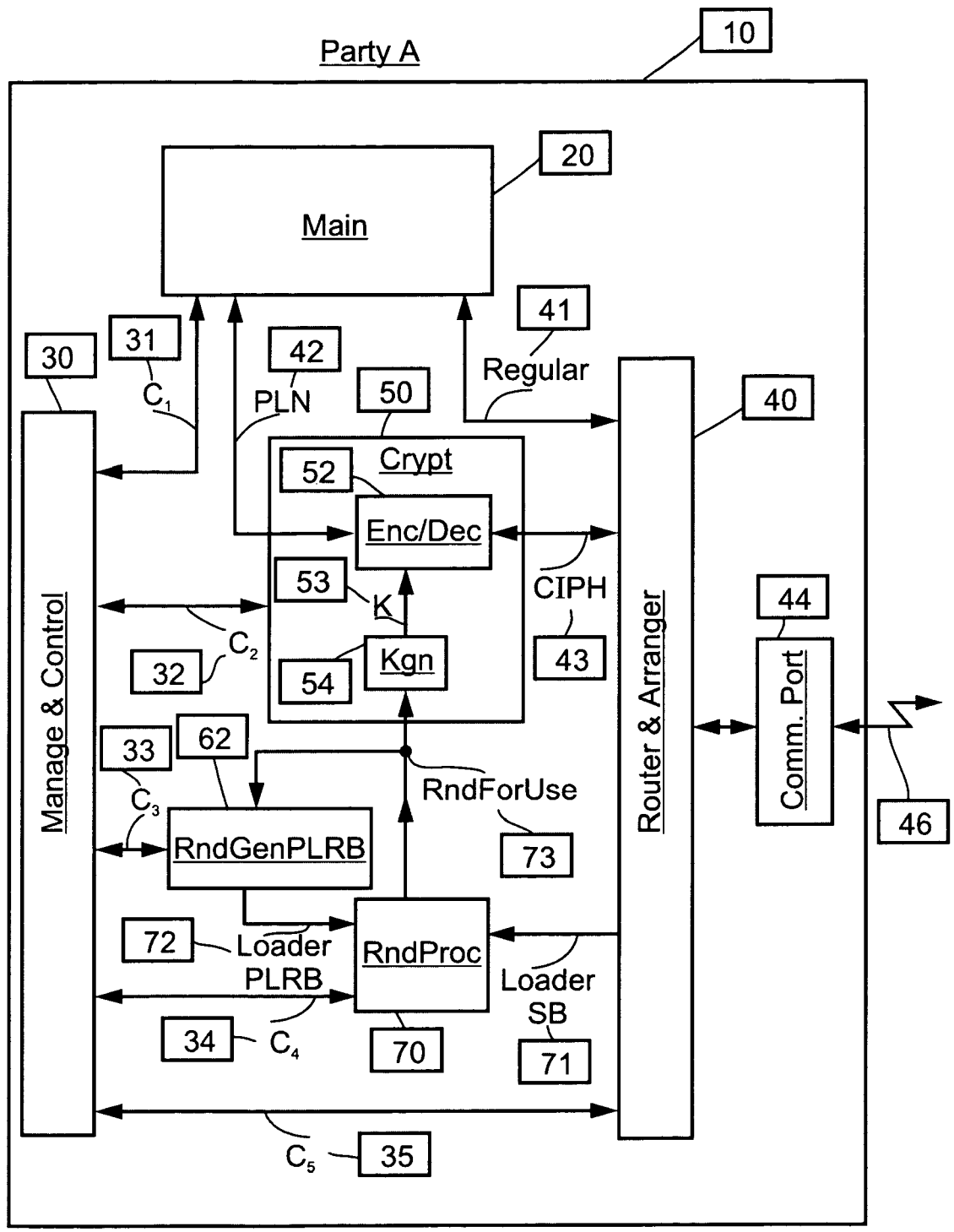
FIG. 2 is a generalized block diagram showing a communication device for use in the embodiment of FIG. 1.

FIG. 2 is a simplified diagram illustrating a preferred secure communication link management device 10 for location at a party for secure management of a communication link according to a first preferred embodiment of the present invention. The link management device 10 carries out key management by using a random process available at a party (Party A in FIG. 2). The diagram shows principle features of the link management device 10 and interconnection therebetween. The skilled person will be aware that a key management device of the kind described can be executed in hardware and/or in software. The device is usable to provide continuous production of new keys for use in the communication link, and as will be explained below, two such devices remotely located, are able to work on the same random process to produce identical keys at remote locations without making the random data available for an eavesdropper.

Link management device 10 comprises six major functional components, each for the fulfillment of a different task. Each of the components is interconnected as shown.

A main process unit 20 carries out local user processing. It may be the interface through which the user enters his plaintext for communication and through which he reads decrypted incoming messages. It may typically be a general purpose PC or part thereof.

A Manage/control unit 30 manages and controls the key management issue, especially the randomly produced keys.

A router and arranger unit 40 routes messages to a communication port 44, and receives messages therefrom which have arrived from the network. The router and arranger unit 40 additionally supports other units, by arranging, preparing and distributing message bits in a desired manner, as will be explained in more detail below.

An encryption engine 50 is responsible for encrypting messages for secure transmission, and decrypting received encrypted messages, and also preferably carries out key management mission, including generation of keys.

A pointer generator RndGenPLRB 62 prepares or generates pointers, hereinafter 'PLRB' (places to pick random bits) for use in executing random processes as will be explained below.

A random processor 70, associated with the pointer generator 62, uses the output of the pointer generator 62 to carry out random processes.

Main processor 20 transmits/receives regular messages (unencrypted) via a regular or plaintext link 41. The message is preferably passed untouched through Router & Arranger 40, to or from the communication port 44, while messages requiring secure transmission are sent via plaintext, PLN, line 42 to encryption engine 50, where the plaintext is encrypted by encryptor/decryptor, hereinafter Enc/Dec unit 52, to be output, in the form of cipher text,—via cipher text, CIPH, line 43, to Router & Arranger 40. The router & arranger 40 arranges the cipher text and sends it to random processor 70, as well as to the Communication Port 44 for output via link 46 to the open network. Similarly, secure encrypted received messages are received from the communication line 46, through Communication Port 44, into Router & Arranger 40 to be arranged and sent to random processor 70. The router & arranger also sends the message via CIPH line 43 to encryption engine 50, for decryption by Enc/Dec unit 52. The decrypted message is then sent to the main processor 20 via PLN line 42.

Enc/Dec unit 52, is preferably fed with changing keys, randomly produced in a key generation unit 54, as will be explained in more detail below and distributed via key line 53, to a key input to the Enc/Dec box 52.

The random processor 70 is preferably loaded with a bit sequence via connection 71, hereinafter loader SB line, the bit sequence being from secure messages currently being exchanged and output by the Router & Arranger unit 40 as described above. The bits sequence is supplied from the router and arranger but a selection thereof is made using the pointers sequence obtained via loader PLRB line 72, from the pointer generator 62. A sequence of random bits is thus output from the random processor via 'RndForUse' line 73, and is input to the key generation unit 54, for randomly producing keys. The sequence is preferably additionally fed as an input into the random generator 62, for randomly producing new random pointers.

Manage/control unit 30 is responsible for the activation, synchronization and simultaneous & correct working of the link management device 10 and in particular all of the parts thereof involved in secure transmission, including key production and key management. Management and control is exerted via control lines, for example C1 . . . C5. In the link management device 10, control line C1, 31 is connected to main unit 20, control line C2, 32, is connected to encryption engine 50, control line C3, 33 is connected to pointer generator 62, control line C4, 34 is connected to random processor 70 and control line C5, 35 is connected to Router & Arranger 40.

The link management device 10 thus encrypts secure messages using continually changing keys, which keys are randomly produced using random data, the random data being produced by random processes that work alongside and in parallel with the encryption process as it proceeds. Furthermore, when receiving secure messages, the messages are decrypted using continually changing keys, which keys are produced randomly, that is using random data which is itself produced by random processes that work alongside and in parallel with the decryption process as it proceeds.

As described above, there is provided a system which, when duplicated at two parties, may provide a secure channel between two communicating parties, for transmitting and receiving encrypted messages in either direction, using continually randomly produced and exchanged keys, which same continually randomly produced and exchanged keys may be used by the receiver for decryption, even though no actual key is transferred. The system thereby solves the key management issue as presented in the background.

Figure 3:
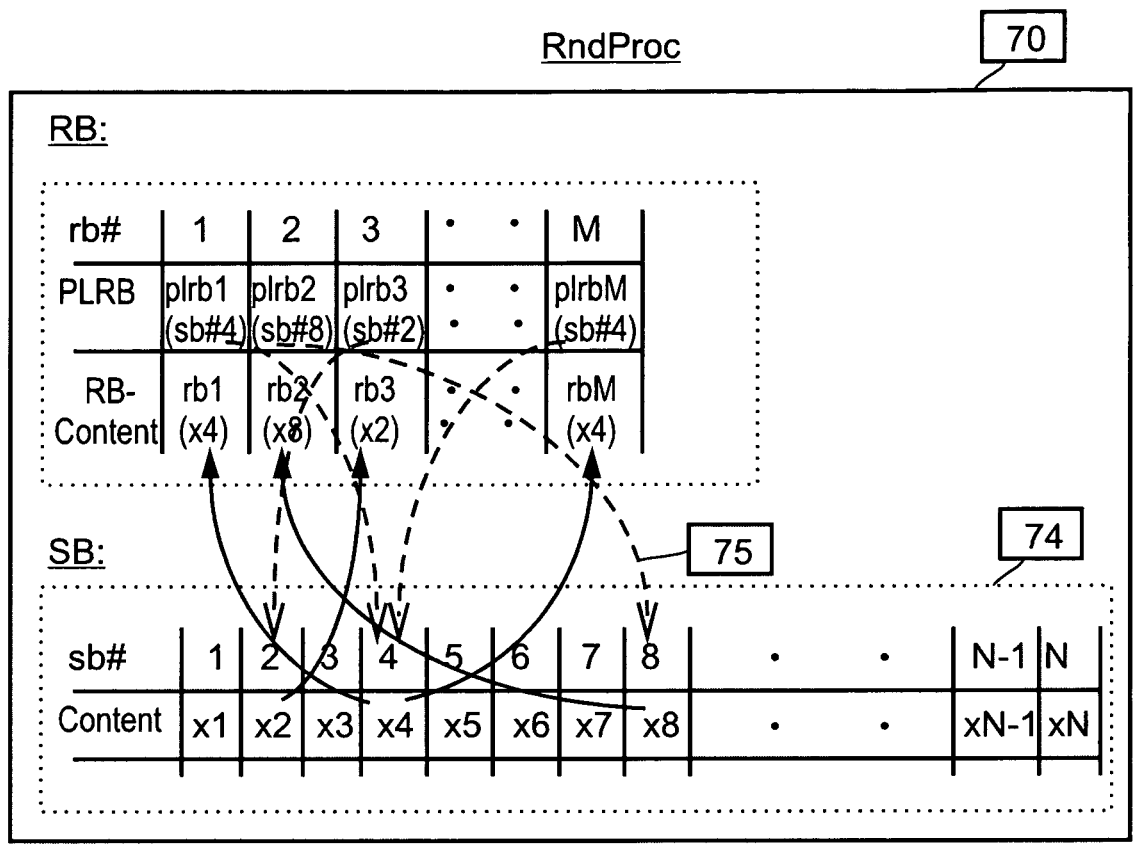
FIG. 3 is a simplified diagram showing how each party may obtain an identical random data stream for use in the embodiment of FIG. 1.

Reference is now made to FIG. 3, which is a simplified diagram of a process for the production of a random data stream for use with the embodiment of FIG. 2. The diagram illustrates in tabular form a preferred process for use in the random processor 70 of FIG. 2.

The random process illustrated in FIG. 3 may be considered in simple terms as a digital analog of a straightforward "choose balls out of boxes" process as featured in texts about random processes and probability, in which questions are asked about how many are black and how many are white and in what order. It will of course be appreciated that the random process illustrated in FIG. 3 uses bits (having values 0 and 1) instead of colored balls.

The random process may be illustrated as follows: Given a sequence (or stream) of N bits, denoted 'SB' sequence 74, each bit has an addressable position in the stream which may be denoted sb#—meaning that the stream bits are ordered and numbered from 1 to N, each thus denoted bit position having a content—$x_1$, $x_2$, $x_{N-1}$, $x_N$ (0 or 1). The content may be analogous to the colors black white of the ball analogy.

The SB sequence comprising N ordered stream bits, is held in a field 74 which is analogous to an arrangement of boxes holding the colored balls.

Separately from the SB bit sequence is a separate random bit field denoted 'RB'—comprising M columns and 3 rows: row 1 being the 'rb#' row, which indicates a random bit position in the M ordered random bits sequence (random bit number), row 2 is the PLRB row (Place of Random Bit) which indicates in each of its cells—$plrb_1$, $plrb_2$ $plrb_3$, . . . , $plrb_M$—a different address in the SB stream to find a bit, that is to say each cell in the row contains a pointer to any of the bits in the SB bitstream. The pointer is preferably used in order to pick out a bit from the SB stream and copy it into the cell corresponding thereto in row 3 denoted the 'RB-Content' row— which is to say the row containing the random bit content.

Thus for example, if the SB were to comprise the following 10 ordered stream bits (N=10) 1,0,0,0,1,1,0,0,1,1, which is to say that the content of SB position 1 is 1, the content of SB position 2 is 0, the content of SB position 3 is 0, the content of SB position 4 is 0, the content of SB position 5 is 1 and so on.

Now, in the same example, let us say that RB is of length 4 (M=4) and the PLRB row positions contain data content 3,5,9,3, respectively. Then random bit number 1 (rb#=1) has a $plrb_1=3$, and therefore bit number 3 is selected from the SB, which happens to have a content of 0. Likewise, random bit number 2 (rb#=2) has a $plrb_2=5$, and thus bit number 5 is selected from the SB, bit position no. 5 having a content of 1. Again, random bit number 3 (rb#=3) has a $plrb_3=9$. Thus, bit number 9 is selected from the SB, which bit position has a content of 1. Finally random bit number 4 (rb#=4) has a $plrb_4=3$, and thus bit number 3 is selected from the SB, which has a content of 0. Thus, an ordered sequence of 4 random bits: 0,1,1,0 (the content of the cells of 'RB-Content' in order, respectively) is obtained.

Now, preferably the SB stream is relatively long and comprises well distributed bits, that is to say a good distribution of distributed zeros and ones. In the present context the term "well distributed" is taken to mean that the bits are not in any kind of pattern, and the quantities of zeros and ones are close to equal. Preferably, even for large numbers the ratio should not be exactly 50%:50%.

Furthermore the number of random bits to be picked out of that stream bits is preferably relatively much lower than the total number of bits present in the SB stream, that is to say M<<N. Furthermore it is preferable that the PLRB stream, the addresses for picking bits from the SB stream is obtained and introduced entirely independently of the SB stream. Provided the above conditions are fulfilled then the above mechanism may be regarded as a random process, just like tossing a fair coin M times.

Figure 4:
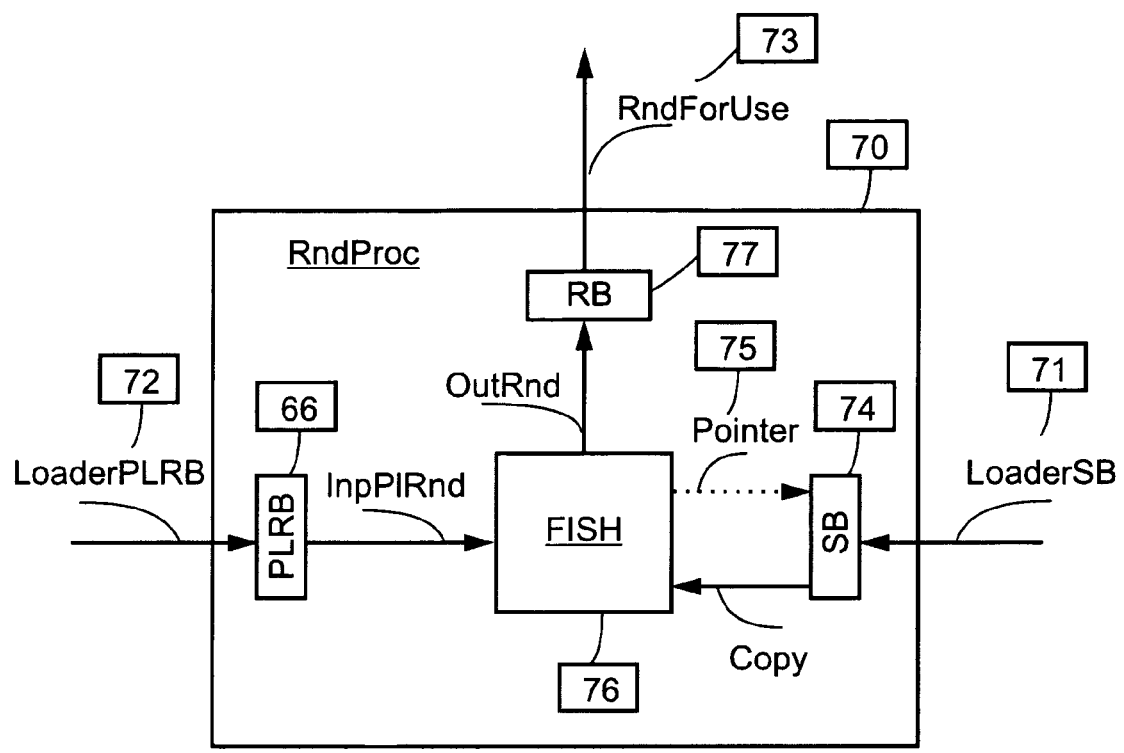
FIG. 4 is a simplified block diagram illustrating apparatus located with a given party for obtaining a random data stream from a bitstream data source in accordance with the embodiment of FIG. 1.

Reference is now made to FIG. 4, which is a simplified schematic diagram showing a mechanism according to a preferred embodiment of the present invention for carrying out bit selection as described above with FIG. 3. In FIG. 4, broken line arrows 75 symbolize selection by pointers of a bit from the respective bit stream, that is to say—which of the SB stream bits to copy, and the back directed full line arrows symbolize the act of copying of the content of that bit (0 or 1) into the respective RB position.

The PLRB pointer data items ($plrb_j$, where $1 \leq j \leq M$) are defined such that $1 \leq plrb_j \leq N$, and allowing repetitions means allowing two or more 'plrb's to be the same. Thus two or more random bits may be copied from the same stream bit as was in fact shown in the numeral example above, as the 1st and the 4th random bits were selected from stream bit # 3. If not allowing repetitions then of course each 'plrb' will be different. Generally, and possibly counter-intuitively, allowing repetitions gives the greater mix of possibilities and therefore is preferably set as the default setting.

Now, it is known that $2^M<<N^M$ if N>2 and $M \geq 1$. As each bit can be a zero or a one, then having M random bits gives $2^M$ possibilities for the sequence of M random bits, but choosing M bits out of N ordered bits, with repetitions gives $N^M$ possibilities. Thus guessing the final random bit stream obtained from the longer sequence using pointers is intrinsically harder than guessing an M bit sequence in itself.

Returning to FIG. 4, there is shown a structure, which may be implemented in software, hardware or a hybrid thereof, for implementation of the random process of the kind illustrated in FIG. 4. The structure may be incorporated within random processor 70 in device 10 of FIG. 2.

Random processor 70 preferably comprises PLRB register 66, which holds M random bit pointers. The pointers are preferably input into random selector (FISH) 76 via a connection denoted InpPlRnd. The random processor 70 further comprises an SB register 74 which holds the N SB stream bits, and also comprises an RB register 77, which holds M output random bits, the output random bits being obtained as described above.

Random selector (FISH) 76 receives as an input the content of PLRB register 66, through line InpPlRnd, as described above. Thus the random selector 76 is able to select bits from the SB register 74, using Pointer 75, and to copy the selected bits via the Copy connection into the random selector 76. The M random bits may then be output, through line OutRnd into RB register 77, from which they may be used as random data in whatever random process is needed.

Random processor 70 preferably has two inputs as follows:
a) Loader PLRB line 72 from pointer generator 62, for supplying PLRB register 66 with M pointers, and
b) Loader SB line 71, from the Router & Arrange box 40, for loading SB register 74 with N ordered stream bits.

In addition there is provided a RndForUse output line 73, from RB register 77 for supplying the output M random bits to destinations such as encryption engine 50 and pointer generator 62, as illustrated in FIG. 2.

Figure 5:
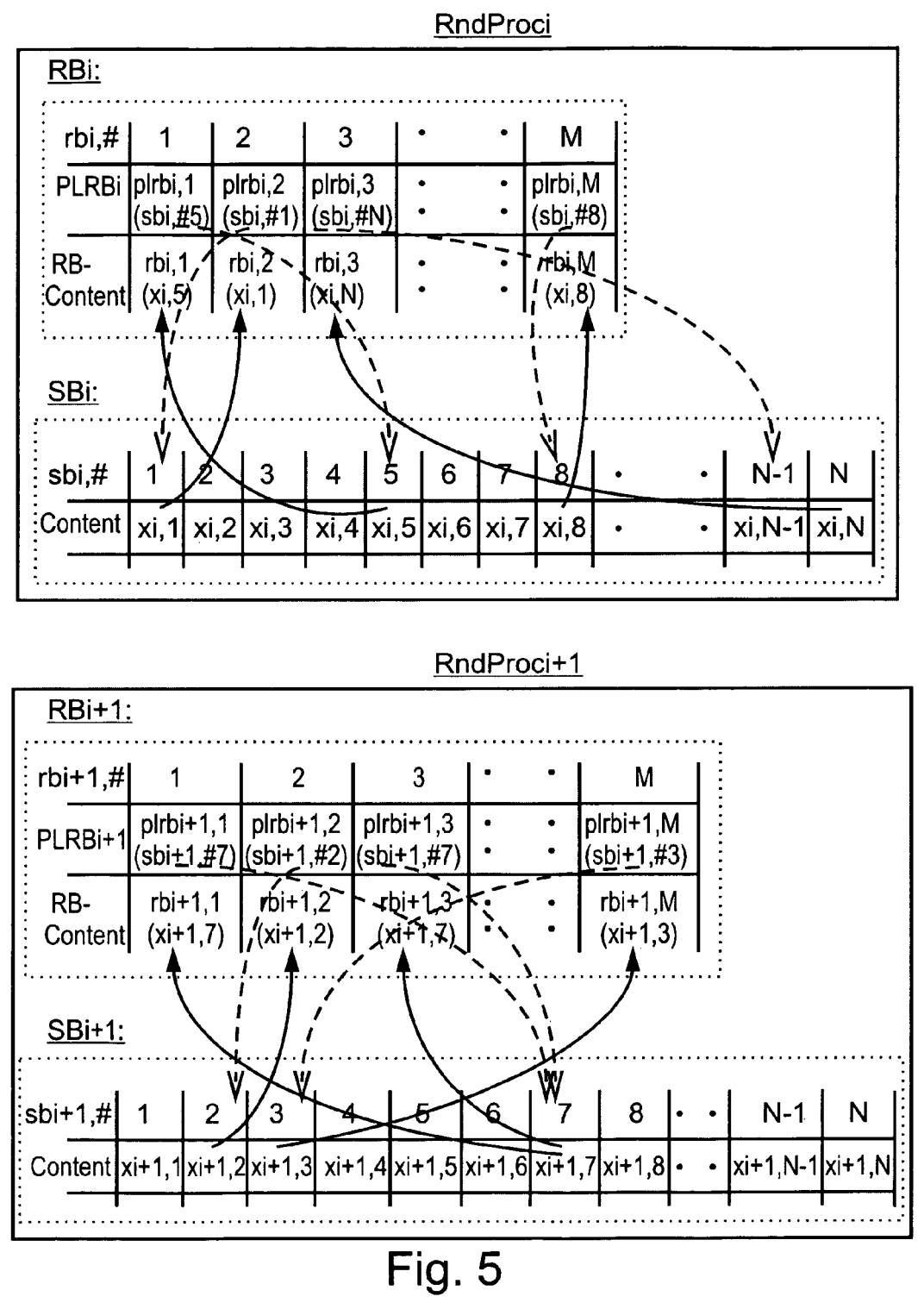

Reference is now made to FIG. 5 which is a simplified schematic diagram showing in tabular form two consecutive random processes of the kind shown in FIG. 3.

The random processes illustrated in FIG. 5 are named $RndProc_i$ and $RndProc_{i+1}$ respectively, wherein the index i (or i+1) is used for indicating the number of the random process in a sequence of successively activated random processes (each activation being one round of obtaining an output of M ordered random bits from the SB). The index may be added to those parameters used already in FIG. 3.

In the embodiment, a series of different processes are used in order, thus: $RndProc_1$, $RndProc_2$ $RndProc_3$, $RndProc_4$ It is preferable to ensure that each random process differs from each other random process, meaning that its output of M random bits is different from each other process in a random way. Thus preferably, for each process different stream bits—SB are used, or different address bits—PLRB. In a particularly preferred embodiment, both inputs, the SB and the PLRB, are changed for each process, and are selected from independent sources, in order to improve the level of randomness.

Figure 6:
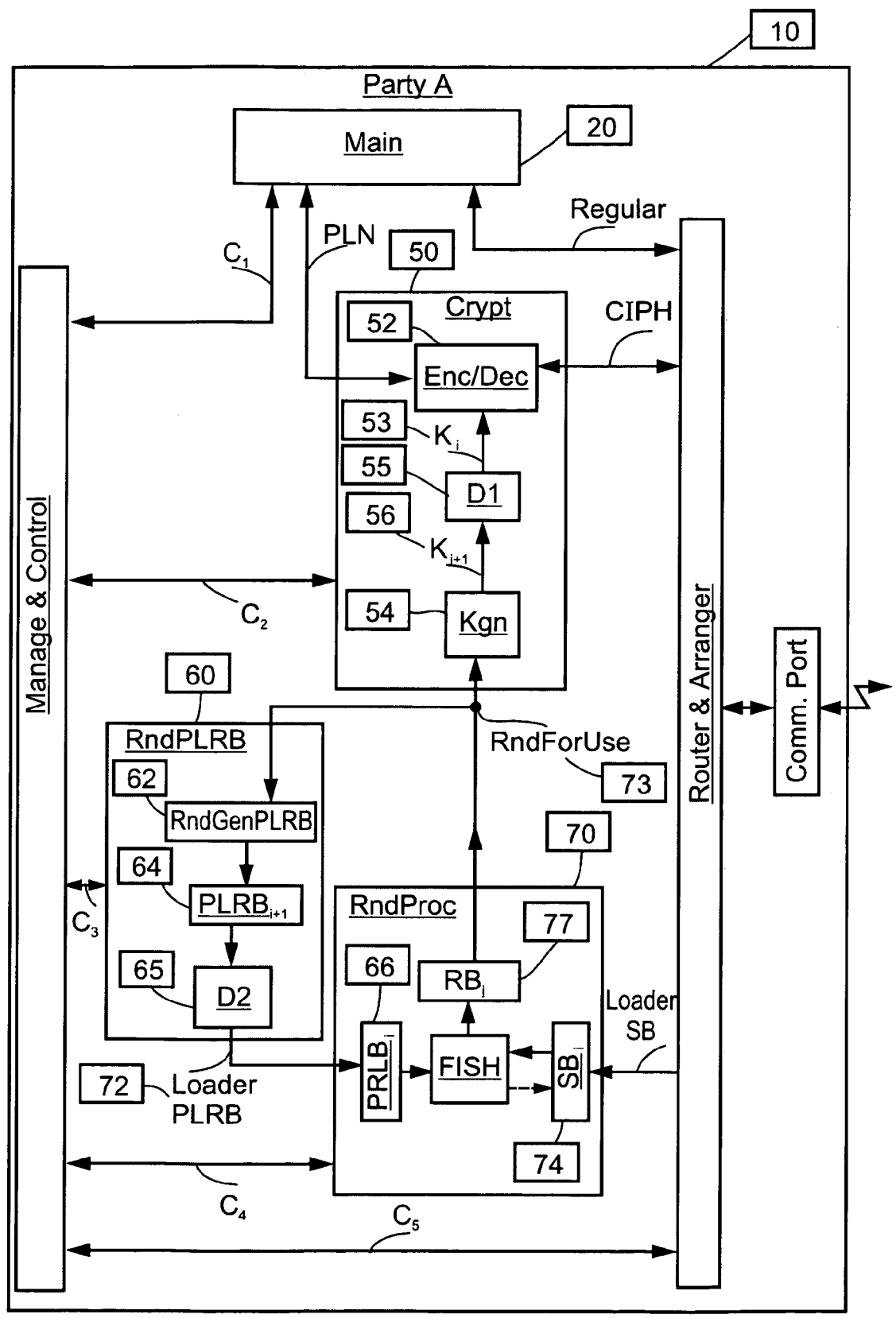
FIG. 6 is a simplified block diagram showing a device for secure communication according to a second preferred embodiment of the present invention.

Reference is now made to FIG. 6, which is a block diagram illustrating a structure, implementable in software, hardware, or a hybrid thereof, for implementation of the random processes of the kind illustrated in FIG. 5. The figure illustrates the sequential manner of the system. Parts that appear in earlier figures are given the same reference numerals and are not discussed in detail again except as needed for an understanding of the present embodiment.

FIG. 6 illustrates in greater detail the device of FIG. 2 above, for achieving consecutive execution. To understand the figure, it is necessary to bear in mind that a current execution step is indicated by index i, and the next consecutive step is indicated by index i+1.

Thus, FIG. 6, differs from foregoing figures by including in encryption engine 50, a D1 delay register 55. In any process step i the key generator 54 preferably obtains, via RndForUse line 73, the $i^{th}$ step random sequence of M random bits, and in turn generates a key $K_{i+1}$, which is transferred via $K_{i+1}$ line 56, into D1 delay register 55 ready for use in the next, i+1 process, to provide a key therefor.

Meanwhile, in step i, D1 delay register 55 outputs, via $K_i$ line 53, into Encryption unit 52, a previously generated key, $K_i$, for use as an encryption/decryption key, for the current process.

FIG. 2 above had a pointer, or random address, generator 62. In the embodiment of FIG. 6, the pointer generator is replaced by a random address unit 60 of which the pointer generator 62 is only one part.

Thus, with reference to FIG. 6, random address unit 60 is preferably responsible for generating and handling, in a consecutive manner, serially generated PLRB's, the addressing or pointer sequences. Preferably, the pointer generator 62, obtains, in step i, via RndForUse line 73, the $i^{th}$ step random sequence of M random bits, and in turn generates $PLRB_{i+1}$, which it places in $PLRB_{i+1}$ register 64. From register 64 the generated $PLRB_{i+1}$ is transferred into D2 delay register 65, where it is stored for the next i+1 process, to be used in that process as an input PLRB. At the next process it is thus loaded, via LoaderPLRB line 72, into $PLRB_i$ register 66 of RndProc Section 70, as the PLRB pointer sequence.

Meanwhile, in step i, D2 delay register 65 outputs the step i $PLRB_i$ pointers, via LoaderPLRB line 72, into $PLRB_i$, for use in current process i.

Thus, FIG. 6 illustrates consecutive process activation. Consecutive process activation may be summarized as follows:

In process i, encryption engine 50 encrypts or decrypts a secure piece of a message using a key $k_i$. At the same time and preferably operating in parallel, random processor 70 receives input data from inputs as follows:

a.) $SB_i$, The N stream bits of the current process are received from Router & Arranger Section 40, via Loader SB line 71 into $SB_i$ register 74 (the stream bits are preferably obtained from the ciphertext piece currently passing through the Router & Arranger 40 as discussed above), and b) $PLRB_i$, the M pointers of the current process are obtained from random address unit 60, via Loader PLRB line 72 and are loaded into a $PLRB_i$ pointer register 66. Preferably, the pointers were generated one process earlier, that is to say as part of process i−1, in the random address generator unit 60.

Random Processor 70 is now able to produce the M random bits of the $i^{th}$ step, which may now be placed in RB register 77.

At the same time and preferably in parallel, key generation unit 54 preferably generates a key $K_{i+1}$ for use in the next process. The key is preferably generated using the current set of random bits $Rb_i$, and pointer generator 62 preferably generates the pointers for the next step, by use of the same current random bits $Rb_i$.

In the following process, the index i is preferably incremented and the above described procedure is repeated.

Figure 7:
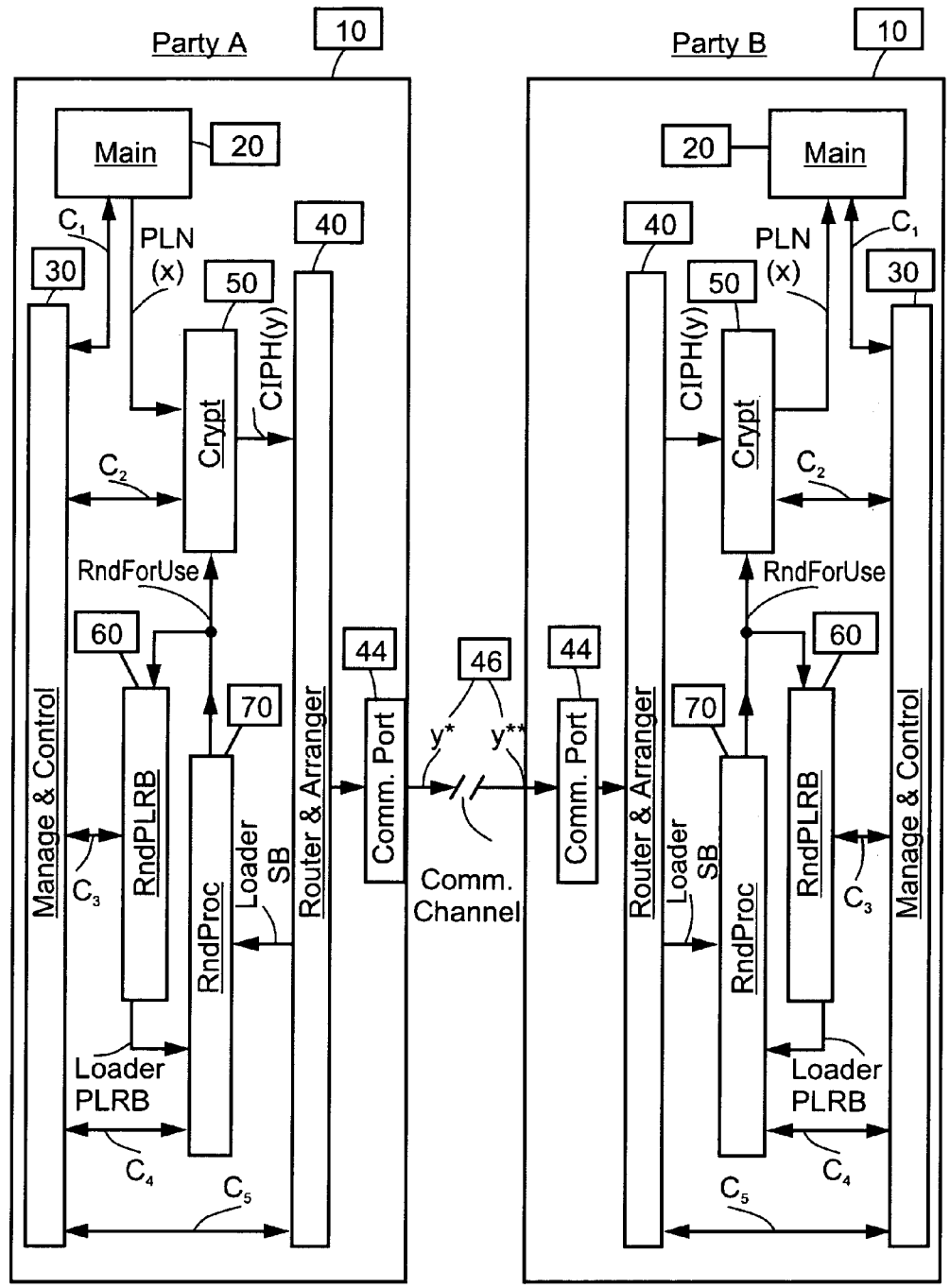
FIG. 7 is a simplified block diagram showing two communication devices of the embodiment of FIG. 6, connected together over a communication channel.

Reference is now made to FIG. 7, which is a simplified block diagram showing two of the devices of FIG. 6 connected together for the purpose of carrying out a secure communication. In FIG. 7, two parties are illustrated, each having the device of FIG. 6. Individual parts are given the same reference numerals and are not discussed again except as needed for an understanding of the communication link.

Party A transmits a secure message to party B. It is assumed that the parties have attained synchronization and retained the synchronous state. Thus, Party A can in each case use the ciphertext before transmitting it to the Communication Channel 46, via communication Port 44. The ciphertext is preferably used as a source for Router & Arranger 40 to provide successive streams of bits $SB_i$, $SB_{i+1}$, $SB_{i+2}$, $SB_{i+3}$, and so on throughout the duration of the message, to support consecutive random processes. As discussed above, the successive SB streams may be used to produce encryption keys $K_{i+1}$, $K_{i+2}$, $K_{i+3}$, to be used successively along the message length;

At the same time, party B uses the ciphertext, following receipt from the Communication Channel 46, via party B's Communication Port 44, as a source from which Router & Arranger box 40 is able to provide successive streams of bits $SB_i$, $SB_{i+1}$, $SB_{i+2}$, $SB_{i+3}$, and so on throughout the duration of the message, to support consecutive random processes. As with party A, the successive SB streams may be used to produce encryption keys $K_{i+1}$, $K_{i+2}$, $K_{i+3}$, to be used successively along the message length;

The following notation is used in FIG. 7:

a) PLN line 42 is here notated as PLN (x)—'x' being the symbol for plaintext in the literature, b) CIPH line 43 is here notated as CIPH (y) as 'y' is a common symbol for ciphertext in the literature c) the Communication Channel 46 is headed with the symbols 'y*' and 'y**', The symbol 'y*' indicates actual data being output to the channel, which is not the same as the pure ciphertext 'y', but has, for example, added control bits, headers, etc. The symbol 'y**' indicates data as it arrives from the channel, which may be a noisy and distorted version of the message as output to the channel, message bits may change from '0' to '1' and vice versa.

It will be appreciated that as long as the parties remain in synchronization, a new encrypted message may be started using the last produced key of the previous message. Such a key may have been retained, for example in the D1 key register 55.

Thus as long as the parties remain in synchronization, they are able to maintain a secure communication link using cryptography without transferring keys or like secrets over the lines. There is thus provided a closed solution for the key management issue discussed above. In fact, once synchronization has been carried out, key changes may be made as often as required, to achieve a desired level of security, without requiring any substantial increase in the complexity of the link.

Now, as will be described below, the preferred embodiments include features for maintaining synchronization between the parties and for allowing each party to be aware that it is in synchronization. The features include an ability to overcome normal levels of channel noise and distortion.

It will be appreciated that since bits of the cipher text itself are used as one parameter to produce the random bits (RB) and the very same bits are used for generation of a future key, correct versions of the message bits which are chosen to be the random bits are needed at the receiver. Thus, known bit error correction techniques are preferably used as part of the synchronization maintenance features. A system of acknowledgements between the parties preferably prevents occurrence of the kind of situation in which one of the parties moves from one process to the next whilst the other fails to receive a section of ciphertext and thus gets left at an earlier stage. In the event of total loss of synchronization a feature for regaining synchronization that provides positive identification of the parties and excludes eavesdroppers, is also described hereinbelow.

It will be apparent from the above description that key management, as provided in the present embodiments, is a process that takes place simultaneously and synchronously at all parties over the duration of the communication. Thus, in any given step i, pointer bits $PLRB_i$ are selected, stream bits $SB_i$ are selected, preferably from current ciphertext, and output random bits $RB_i$ are produced. Further on in the apparatus, a key $K_i$ is used for encryption/decryption of a message, which key was obtained a process step earlier, and was held in memory in readiness for use. The currently obtained random bits $RB_i$ are preferably used for generating for the next step, step i+1. Preferably the random bits $Rb_i$ are used to obtain both the pointers $PLRB_{i+1}$ for the next stage and to generate the key $K_{i+1}$. The foregoing is referred to hereinbelow as key management.

In the following, the issue of synchronization loss is considered, namely with what the parties may do in case they lose synchronization in respect of key management, that is, in respect of the random processes, and consequent key generation. In the event of synchronization loss, one party may be in process i+1, or even i+2 or higher, while the other party remains in step i. Consequently one of the parties may be using key Ki+1 or even Ki+2, or higher, while the other party is still using key Ki. In such circumstances, continued communication is not possible, which is to say the parties cannot operate a simultaneous, synchronized or identical random process, and consequently cannot produce the same encryption/decryption key, even though the bit stream itself (SB) may be correctly represented at both of the parties.

The issue of synchronization is preferably dealt with as three separate issues as follows:
 a). Identification of synchronization loss.
 b). Overcoming of low level synchronization loss, and.
 c). Resynchronization in the event of total synchronization loss.

Identification of synchronization loss is dealt with in the present embodiments by exchanging control messages between the parties. The control messages preferably carry information about mutual synchronization between the parties, about the key management process as a whole, and information allowing each party to tell about the current random process that the other party is in. The parties are thus able to determine whether or not they are both in the same random process (both in process i or i+1 etc.) in terms of random bit production, pointer production and key production. It will be appreciated that the control messages preferably do not contain sufficient information to allow an eavesdropper to discover sufficient data about the processes In a preferred embodiment, control messaging is carried out as follows: The control messages themselves may be in plain text—that is to say not in themselves encrypted, and preferably comprise indicator bits indicating states of sensitive process data. Sensitive process data includes any of the random output bits, the bits of the key being used, and the pointers.

The indicator bits are preferably produced by carrying out a one way function on any of the 'sensitive data', or by carrying out a one way hush function on such sensitive data, or are taken from redundancy bits which are the result of an error detection code used on the sensitive data, for example a CRC of the sensitive data. The indicator bits allow another party to realize immediately if it is in synchronism or not, by comparing received indicator bits with self calculated indicator bits. However, in the case of one way or hush functions the indicator bits are of no use to anyone who does not have his own identical process to compare it to, even if he possesses the same one way function. The CRC check bits are preferably too sparse to give away any information, and thus confidentiality is sustained.

Overcoming of low level synchronization loss is solved in the present embodiments by using the control messages between the parties to carry out an error correction code procedure on the random bits produced. Thus the control messaging serves not only as an error detection mechanism as explained above, but also as an error correction feature for minor cases of bits errors in the communication process. Generally, the correction is applied to the SB stream bits, from which eventually the RB random bits are selected. For the present purpose, however, it is preferable that the bit selection is followed by executing an error correction mechanism at least on the particular stream bits that are eventually used as random bits, or on the precise resulting random bits, RB. Thus the parties are able to correct the particular stream bits, or the precise random bits RB in the face of expected or normal bit error rates over the communication link. Thus in the face of expected error rates, the parties remain mutually synchronized.

Standard error correction procedures such as may be used in the error correction mechanism described above, comprise limits on the number of bit errors they are able to correct for. The limits are generally set on system design and involve a trade-off between data rate and correction level. Thus it is possible to design in very high levels of error correction but at the cost of communication overhead. In any case, there is always a maximum error level that is protected against and there is always a finite probability that such a maximum may be exceeded, for example during a burst of unexpectedly high error rates on the line. Such high error levels are liable to lead to de-synchronization between the parties, despite the error correction ability described above.

Nevertheless, proper setting of the error rate maximum should ensure that loss of synchronization is rare. In one preferred embodiment the maximum error rate is set dynamically in that a measurement is made of the current noise level on the line and an error correction encoding level is set in accordance with the most recent measurement. Using dynamic error rate setting ensures that only very sudden changes in noise levels lead to loss of synchronization.

Thus, the parties are able to:
 1. recognize whether they are or are not in synchronization, and
 2. prevent synchronization loss due to bit errors by correcting bits up to a maximum error correction level.

If the error rate is exceeded then synchronization loss is unavoidable. Such loss may occur for example as the result of a high noise event or a cut in the communication link etc. In such a case, synchronization is preferably regained without loss of confidentiality to outsiders and without giving the opportunity for outsiders to impersonate the other party. One known attack method against secure communications is to insert noise into the communication, causing synchronization loss and the to attempt to gain synchronization with one or both of the parties, in the former case impersonating the second party. The parties are generally remotely located, and the aim of the resynchronization is to achieve identical sensitive data sets, as defined above, at each of the parties, in the right places to carry out the current step in synchronism and to return to the correct process sequence.

The present embodiment achieves the above described re-synchronization by keeping an agreed backup set of the sensitive data, to use as what may be described as a resynchronization point. Thus, when synchronization loss is recognized by any party, the other party is notified and both the parties to the communication preferably re-synchronize to the agreed resynchronization point, from which they are able to execute a mutually identical random process and use a mutually identical random key. From the resynchronization point onwards the parties are able to continue as before.

It will be appreciated that the backup data set must be randomly changed regularly or the resynchronization point would be a major breach of security in the system. How such changes may be performed securely and without the random changes themselves leading to further loss of synchronization, will be explained hereinbelow.

Figure 8:
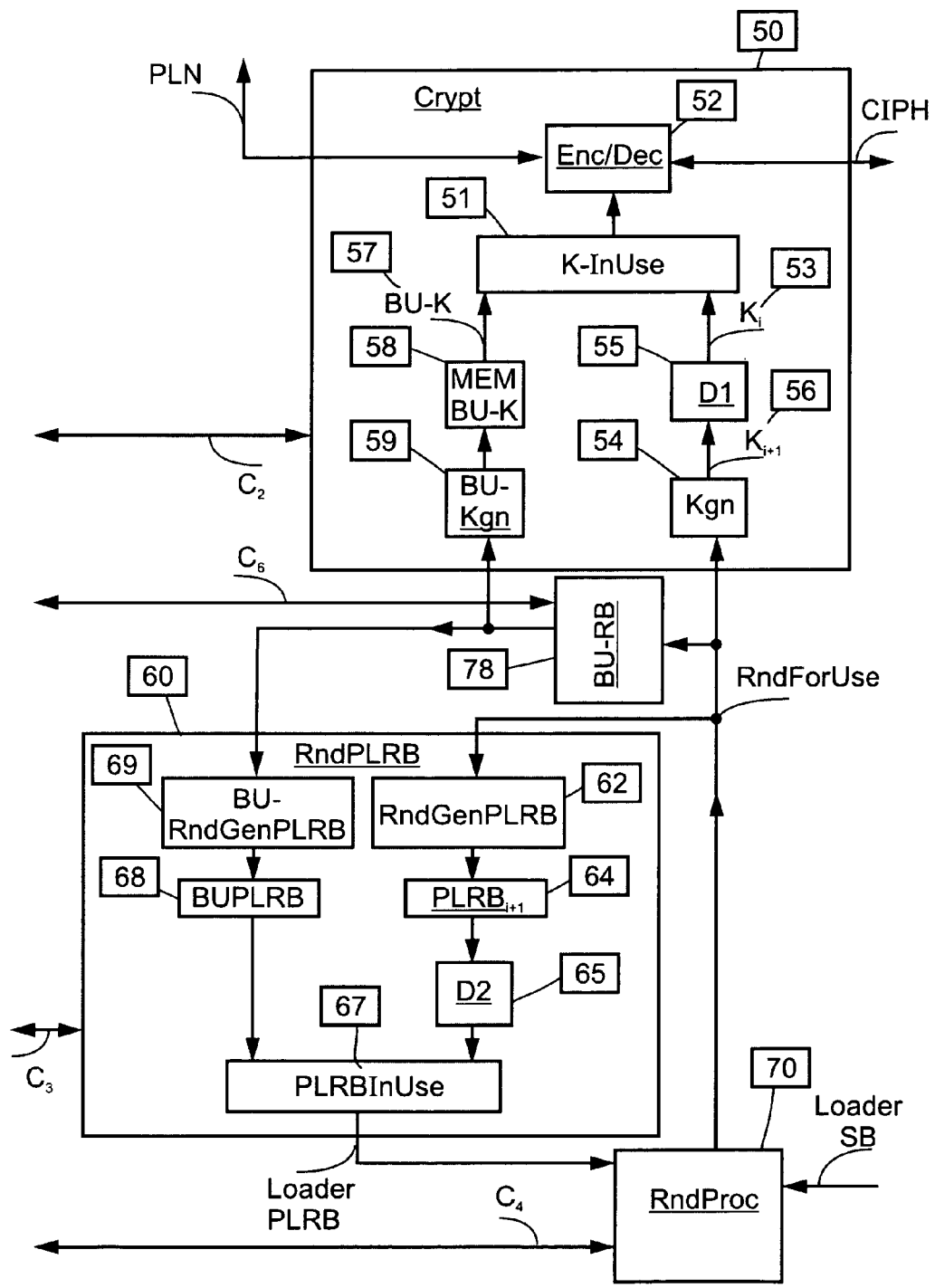
FIG. 8 is a simplified block diagram showing a secure communication device further incorporating functionality for maintaining and regaining synchronization during secure communication, according to a third preferred embodiment of the present invention.

Reference is now made to FIG. 8, which is a simplified block diagram showing part of the device of FIG. 2 in greater detail, showing features necessary for executing resynchronization by use of backup data as referred to above. Parts that are identical to those shown above are given the same reference numerals and are not referred to again except as necessary for an understanding of the present embodiment.

Given that synchronization loss occurs only relatively infrequently, the present embodiments preferably exchange the resynchronization points randomly at a lower frequency than the regular random processes.

Preferably in the regular random processes for each piece of data of such a message, stepping or advancing between one process and the next is timed such as to allow the length (in bits) of a key to be the same as the length of the data the key encrypts, which is to say, any given key is retained for the length of time taken to output a number of message bits equal to the length of the key. Consequently, for any given rate of data transfer, there is multiple key changing for any message of significant length.

On the other hand, the resynchronization points are randomly exchanged only once in many regular key changes. The exchange of resynchronization points is carried out silently in the background, to be ready for use as needed.

FIG. 8 shows more detailed versions of encryption engine 50 and random address generator unit 60, showing additional features for handling resynchronization.

Encryption engine 50, thus additionally comprises a backup key register BU-Kgm 59, a backup key memory MEMBU-K 58, a key in use register K-InUse 51, and backup key connection BU-K 57. The random address generator 60, additionally comprises a backup random pointer generator BU-RndGenPLRB 69, backup pointer register BUPLRB 68 and pointers in use register PLRBInUse 67. Additionally there is provided a self standing back up random bits register BU-RB 78.

During normal synchronized processing, the pointers in use register PLRBInUse 67 takes from D2 register 65, the set of pointers prepared during the previous process for use in the current process. In the event of synchronization loss, for activating a backup procedure, PLRBInUse 67 takes data for use as pointers from backup pointer register BUPLRB 68 instead of D2 box 65. The backup pointer register BUPLRB 68 has preferably been used to store, at an earlier stage, back up data for providing pointers for use in resynchronization.

The backup data for providing pointers that has been stored in backup pointer register BUPLRB box 68, is preferably data that has been generated earlier on in backup random pointer generator BU-RndGenPLRB 69, using random input bits stored in back up random bit register BU-RB 78, which has been accumulating random bits for such a purpose.

Thus, pointers in use register PLRBInUse 67, takes on the role of a gate that decides what input—either from BUPLRB 68 or from D2 register 65—to pass on to the pointers in use register PLRBInUse 67 for use in the current random process.

Meanwhile, in encryption engine 50, during regular processing, the key in use register K-InUse 51 obtains, via Ki line 53, from D1 register 55, a regular key, formed in the normal way as described above for executing a regular encryption/decryption step. By contrast, during synchronization loss, as part of the activation of a backup procedure, the key in use register K-InUse 51 takes, via BU-K line 57, a backup key from backup key memory MEMBU-K 58.

Preferably, the backup key stored in backup key memory MEMBU-K 58, has been generated beforehand in backup key generator BU-Kgn 59, by a generator using random input bits from backup random bit register BU-RB 78, which has been accumulating random bits as described above in respect of backup pointer generation.

Thus, in-use key register K-InUse 51 plays the role of a gate that decides which input—either from backup key memory MEMBU-K 58 (connection 57) or from the D1 register 55 (connection 53)—to pass to the key in use register K-InUse 51 for use as the key, in current encryption/decryption processing.

The backup random bits register BU-RB 78, preferably accumulates and stores back up random bits. The back up random bits it stores may be an outcome of individual or multiple regular random processes, as will be described in more detail below. As described above, the backup random bits are used as random input for generating backup keys and also backup pointers, thereby to create the data necessary for effective resynchronization.

The backup key—stored in backup key memory MEMBU-K 58—and the backup pointers—stored in backup pointer register BUPLRB 68—may be considered as a last resort for the parties to regain synchronization. As mentioned above, the backup data is preferably changed randomly, and the changing-over of backup data therefore must not itself lead to an inability to synchronize.

In the following, a mechanism is described for preventing loss of synchronization due to exchange of backup data, in other words a mechanism for ensuring reliable backup data exchange and ensuring that the two parties attempt to synchronize using the same backup data.

In order to describe the mechanism a number of definitions are introduced as follows:

a. The back up synchronization, or sensitive, data refers to the backup pointers preferably stored in the backup pointer register BUPLRB 68, together with the key stored in the backup key register MEM BU-K 58. The back up sensitive data changes in a random way but identically and synchronously at each of the two parties, once in a series of a predetermined number of L Regular Successful Connections between the parties—Such a series of a predetermined number of L Connections is referred to as a cycle. (e.g.—number of connections in a cycle=L=28)

b. A connection refers to an encrypted communication from one party to the other, having a definable beginning and a definable end. Such a connection may often be followed by a connection from the other party back to the first party. In the course of the connections both parties use—as the transmitter for encryption, and as the receiver for decryption—randomly generated and regularly changing keys, which are generated, as described above by use of randomness produced by executing serial consecutive processing. As discussed above, a random process produces a random bit stream using randomly produced pointers PLRB, and stream bits SB obtained either directly or otherwise, from the ciphertext of the connection itself.

In alternative embodiments the bits may be obtained from other sources, as long as the bit source is something to which both parties have confidential access.

c. A connection preferably comprises consecutive units defined here as sections, each section being a stream of ciphertext bits of a defined length. A new random process is begun for each section including the use of a newly generated random key.

d. Each section thus represents a specific random process, and includes obtaining the output random bits (M random bits) of the respective random process, and a production of a section key, and section pointers. A connection comprises at least one section, the total number of sections in the connection depending on the total length of the connection.

e. A Regular connection is a connection that begins in synchronization, that is to say begins by using the sensitive data left from the previous connection.

f. A Successful connection is a any connection that ends with the parties still in synchronization.

g. Thus, A cycle is built of L consecutive successful regular connections, and a connection is built of 1 or more sections.

h. At the end of a cycle the back up sensitive data—namely the back up key stored in back up key register MEM BU-K 58, and the backup pointers stored in backup pointer register BUPLRB 68—are changed randomly and in the background, that is, a new back up key is produced by backup key generator BU-Kgn 59, and the result is entering and stored in backup key memory MEM BU-K 58, to replace the previous backup key. Likewise new back up pointers produced in backup random generator BU-RndGenPLRB 69, are entered and stored in backup pointer register BUPLRB 68 to replace the previous backup pointers. Both the back up key and the back up pointers are preferably generated from back up random bits gathered during the first K Sections of the respective Cycle. Typically the first K Sections may be from the first connection in the cycle, or at most from the very first few connections of a cycle.

i. Any party that notices, as described above, that it is out of synchronization, preferably ceases counting regular connections within the cycle and preferably freezes at the current position in the cycle. That is to say the cycle counting ceases, not the connections themselves j. After recognition of loss of synchronization, the parties preferably begin, as part of a new connection, that is, at the connection immediately following, to execute a back up activation procedure. The procedure involves taking the back up key and the back up pointers—to begin the first section of the new connection. Following the first section based on the backup data, the consecutive sections of that connection are begun in the normal way of advanced regular keys and pointers and the connection continues as any other.

k. After a back up activation, the first following successful regular connection begins a new cycle, meaning that new random data is initially gathered to form a new set of backup random data. The successful regular connection may be considered the first successful regular connection of the new cycle and the successful regular connections are counted hereon from 1 to L.

Figure 9:
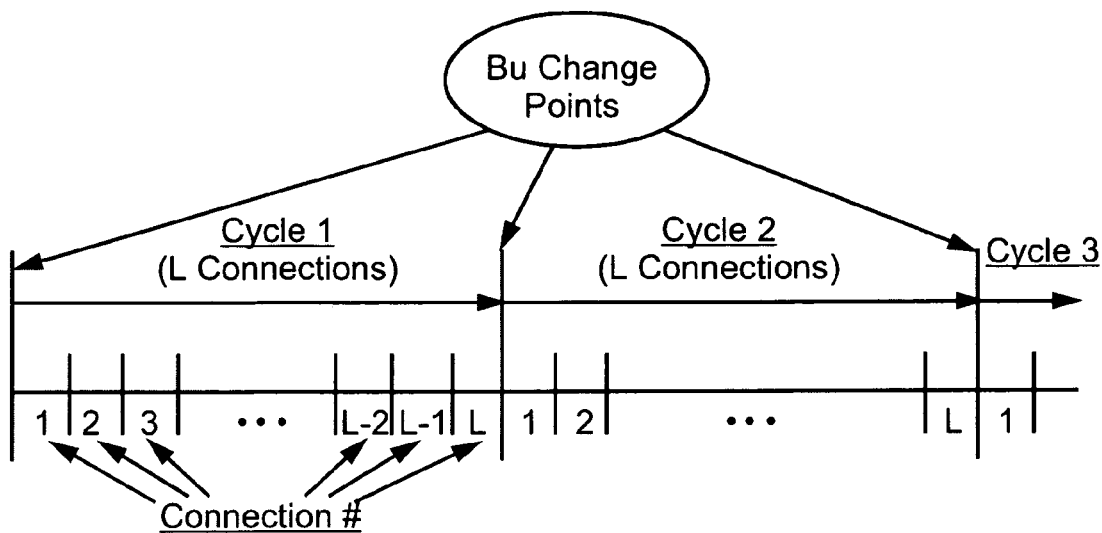
FIG. 9 is a simplified diagram showing how a process using random data may be structured for resynchronization, the structure being useful for the resynchronization embodiment of FIG. 8.

Reference is now made to FIG. 9 which is a simplified diagram showing connections and how they are counted in cycles.

In FIG. 9 there are shown cycles of successful regular connections. As described above, at the end of a cycle—meaning at the end of successful regular connection number L of that cycle—the parties change the back up sensitive data. The actual point of changeover is marked 'Bu Chang Point' in the figure, and a new cycle begins, again running from successful regular connection number 1 to successful regular connection number L, at which point a new 'Bu Chang Point', is reached.

As discussed above, the changes in the back up sensitive data consist for their production on randomness gathered and saved in BU-RB 78 during the first few sections of the first successful regular connection(s) of a Cycle, and which randomness preferably has already been used for and by the regular keys and pointers production, during the course of the regular sections, prior to its use at the change over point, that is, at the end of a cycle. That is to say, the random bits are used at one part of the cycle to form a regular connection and the same bits are later used to form the backup data, far apart from the regular use of those random bits.

The fact that the backup uses data that has already been used in the regular process, means that, since the regular processing has succeeded without loss of synchronization, the data must be correctly held at the two parties. Had the data been incorrectly held at one of the parties then the regular cycle would have lost synchronization at that point, leading to the backup procedure being carried out at that point and new backup data being selected for the new cycle. One issue remains from the Byzantine agreement problem, namely how to ensure that each party is still on the same cycle. That is to say loss of synchronization may occur at or near one of the changeover points. In such a case, it cannot be guaranteed that moving into a new cycle and changing over the backup sensitive data is carried out synchronously between the two parties. That is, one party may have moved on and changed over the back up sensitive data before the other party—perhaps due to the loss in synchronization. If the parties subsequently attempt to resynchronize using different backup sensitive data then it may be appreciated that resynchronization is not likely to succeed.

Figure 10:
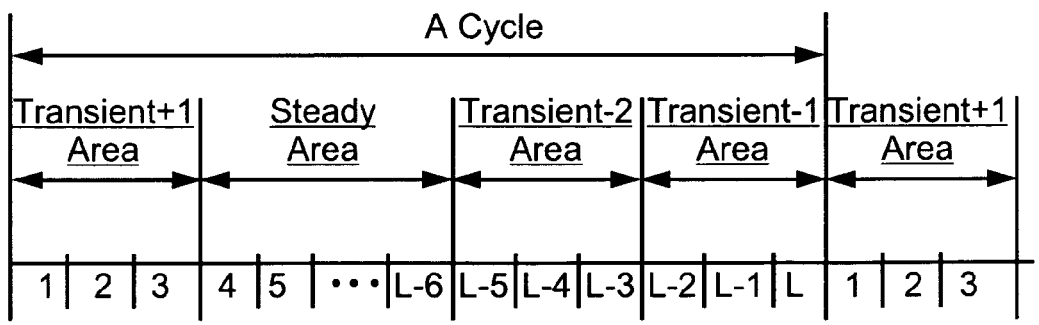
FIG. 10 is a diagram showing the structure of FIG. 9 in greater detail according to a preferred embodiment of the present invention.

Reference is now made to FIG. 10, which is a simplified connections diagram showing internal structure of areas that may be applied to a single cycle in order to overcome the above-described problem of loss of synchronization in regard to the backup sensitive data being used if back up activation is needed in the vicinity of a change over point. In accordance with the embodiment of FIG. 10, a cycle is preferably divided into 4 Areas. The four areas are herein denoted as follows: a steady area, a transient−2 area, a transient−1 area and a transient+1 area.

The areas described above are defined over the cycle and the parties are preferably constrained in that they are not allowed at any time to deviate from each other by more than one area. Such a rule may be enforced using the control messaging described above. Thus, in the case of loss of synchronization, then provided that loss of synchronization is spotted quickly, it may be presumed that the parties move away from each other by a maximum of one more area. Thus a worst case separation of two areas may be assumed. In the case of communications which are smaller than a section in length it may be assumed that a worst case separation of one area is in operation. Thus, a Cycle is divided into 4 areas, and a constraint is set in that the parties can be separated from each other by one area only. Thus, if the parties are out of synchronization, and if they recognize the synchronization loss immediately then the cycle counting ceases in accordance with rule i above. Thus the parties may be separated by 1 or 2 Connections counting, a separation of two connections being a worst-case scenario. Given areas that themselves consist of more than 2 Connections, the constraint works by preventing the separation from exceeding one area. Thus, in a preferred embodiment areas comprising three connections are used, to provide leeway for effective resynchronization The Bu Change Point has what we may define as gray areas close by on either side. The gray areas are areas in which it is possible that that one party has crossed the change over point and the other party has not. Thus, in the gray areas the position of the other party is undefined, leading to a dilemma as to what to do. The parties therefore carefully follow the procedure as will be outlined below, and must take care with discarding backup information following a changeover. In achieving a synchronized changeover the considerations of the Byzantine agreement problem are taken into account.

The Steady Area, as shown in FIG. 10, is relatively far from the last change over point, and relatively far before the next change over point. In case of de-synchronization, a party in the steady area may use the current back up sensitive data in full confidence that the other party is using the same back up sensitive data, based on the presumption that the other party is in the same area or in a nearby one, either one before or one ahead. In either case both have the same stored back up 'sensitive data', and are thus able to resynchronize.

The Transient–1 Area, is a gray area, which is the area just before the changeover point. Here the party must bear in mind that one possibility is that the other party may have moved to the next area, to The Transient+1 Area, that is crossed the changeover point, and have in storage the new back up 'sensitive data'.

The Transient–2 Area, is one more gray area just before The Transient–1 Area and just after the Steady Area.

The transient+1 area immediately follows the changeover point. A party in the transient+1 region at the time of synchronization loss must bear in mind that there is a possibility that the other party may not have changed over and may still be in the previous cycle.

The resynchronization arrangement includes the following rules:
  The gray areas each comprise only a few connections, for example three connections. At the change point (at the end of connection L) new, fresh back up sensitive data replaces the old data in the main memory storage. Thus upon entering into the transient+1 area the main memory comprises the new 'sensitive data'.
  At the transient–1 area and at the transient–2 area i the old back up sensitive data is stored in the main memory. However, it is possible to use, the new data, as necessary, even though it is not yet in the main storage, by generating it as required from the back up randomness stored at the beginning of the Cycle.

If the gray areas have been reached then the new back up sensitive data if used is clearly accurate, for the reasons outlined above, namely that the back up random data used to generate the new sensitive data has already been used successfully for regular connections. Nevertheless, at this point, the old sensitive information is still held as it is in the main memory storage.

Thus at the transient–1 area and at the transient–2 area the main memory retains the old back up sensitive data. However the new sensitive data may be generated as required, from the back up randomness gathered at the beginning of the cycle.

Operation of the resynchronization using the areas as described above is now explained with reference to FIG. 11, which shows in tabular form how each of the parties reacts to the different possible circumstances when synchronization loss occurs in each of the areas. It will be appreciated that there are numerous variations of the way that two parties can achieve successful resynchronization based on the use of areas and the following is exemplary only.

Preferably, at each connection, the parties exchange control messages. Each connection has one party defined as the transmitter and one party defined as the receiver. The transmitter preferably checks its own local control parameters to determine whether it is in synchronization or not.
  If its own local control parameters indicate it to be in synchronization, then it recognizes the situation as a regular connection and uses regular sensitive data to start the connection. The transmitter preferably sends to the receiver a control message indicating a regular connection.
  If its local control parameters indicate synchronization loss, then the transmitter recognizes the situation as a back up connection and uses back up sensitive data to start the connection. The transmitter preferably sends to the receiver a control message indicating a back up connection. The Transmitter then adds an additional field to the control message indicating which back up sensitive data is to be used: the old data or the new data.

The Receiver receives the control message from the transmitter and either agrees to the mode (regular or back up) or disagrees. Agreement and disagreement depends on the receiver's own analysis of the control message received, and on the local control parameters. In general the receiver is allowed to force the transmitter into a backup mode but it is not allowed to force the transmitter out of a backup mode, giving the effective result that any party discovering synchronization loss is able to force resynchronization, that is, the activation of back up mode.

For back up mode the transmitter acts as follows:
Selection of which backup Sensitive data to use is made by the transmitter. The transmitter notes which area it is in.

If it is in the steady area then it has, in its permanent memory the current (old) back up sensitive data. The transmitter thus uses the current (old) backup sensitive data and signals "Old" to the receiver.

If the transmitter is in the transient–2 Area it has in its permanent memory the current (old) back up sensitive data. It thus signals to the Receiver "Old" and uses the current (old) back up Sensitive data.

If the transmitter is in the transient–1 area it has in its permanent memory the current (old) back up sensitive data, but it messages to the receiver 'New' and uses the new backup sensitive data—'new1' in the table—by generating it specifically, as explained above, from the back up random data gathered beforehand, at the beginning of the Cycle. This is because the receiver may already have changed over and is in the transient+1 area of the next cycle, thus no longer having the old sensitive data, but in its current permanent memory has the new sensitive data, that is of the new cycle.

If the transmitter is in the transient+1 area the transmitter has in its permanent memory the next (new) back up sensitive data. It signals "new" to the receiver and uses its current (in memory) backup sensitive data, which is the next (new) one relative to the last cycle.

At the same time the receiver acts as follows:
If the receiver is in the steady area it simply uses the current (old) backup sensitive data, that is the backup sensitive data it has in its permanent memory, and ignores the control message received from the transmitter.

If the Receiver is in the transient–2 area it selects whether to use the current or next (new) ad-hoc backup Sensitive data depending on the control message received.

If the receiver is in transient–1 area then again it uses either the current or new (that is created on demand) backup sensitive data depending on the control message received.

If the Receiver is in The Transient+1 Area, then it ignores the control message and uses its current (in memory) backup Sensitive data, which is the next (new) one relative to the last soon ended Cycle.

It is appreciated that the above embodiment has been described in terms of the transmitting party controlling the resynchronization process. However alternative embodiments are possible in which a single party is initially designated as the master or the receiving party controls the resynchronization, as the skilled person sees fit.

It is noted that whichever of the versions of backup sensitive data is used (the that of the cycle ending, that of the cycle beginning or on demand prior creation of that of the following cycle) then all that is needed is for succeeding connections to be successful for it to be clear that the resynchronization has worked.

One more point is that, following the backup resynchronization procedure, a new cycle is initialized, initiating the counting of successful regular connections from 1 to L again. Preferably, new back up random bits are gathered and stored from first sections of the newly begun cycle to be used at the end of that the newly begun cycle for generating new back up sensitive data for use in any of the ways mentioned above.

The above system provides key management and a result of the above is a valid strong encryption/decryption key. The key management system is suitable for symmetric encryption and in particular may support DES. Alternatively where the key matches the message bits in length it can be used in simple bitwise arithmetic with the message bits in a procedure similar to that commonly used with one-time pads.

It will be appreciated that, whereas the invention has been described above in terms of communication between two parties, further embodiments are applicable in which there are three or more parties to a communication. Thus the invention is usable in a mobile radio system having a base station and numerous mobile stations, or in an intercom system, whether star connected or net connected or connected in any other way. In such embodiments the randomness is obtained in an identical manner and resynchronization is controlled as before by whichever of the parties is the transmitting party, or according to any other control arrangement that may be considered.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. Apparatus for use by a first party for key management for secure communication with a second party, said key management being to provide at each party, simultaneously remotely, identical keys for said secure communication without transferring said keys or components thereof over any communication link, the apparatus comprising:
   a datastream extractor, configured to extract a bitstream from data exchanged between said parties;
   a random selector configured with selection settings identical to those at said second party said selection settings defining a selection, from said bitstream, of a series of bits in accordance with a randomization within said random selector, said randomization seeded by said data exchanged between said parties, said randomization being identical to a randomization carried out at said second party, thereby ensuring that said series of bits is identically selected at both parties, the random selector being operable to use results of said randomization as addresses to point to bits in said datastream;
   a key generator configured for separately generating at said first party a key for encryption/decryption based on said series of bits,
   thereby to separately generate a key at said first party which is identical to a key likewise generated at said second party based on said exchanged information, thus to manage key generation in a manner repeatable at said parties, without transferring said keys or components thereof over any communication link.

2. Apparatus according to claim 1, said key generator operable to generate a new key after a predetermined number of message bits have been exchanged between said parties.

3. Apparatus according to claim 2, said predetermined number of message bits being substantially equal to a length in bits of said key.

4. Apparatus according to claim 1, further comprising a control messager for sending control messages to said remote party, thereby to indicate to said remote party a state of said apparatus to enable said remote party to determine whether said remote party is synchronized therewith to generate an identical key.

5. Apparatus according to claim 4, further comprising a synchronized state determiner, for determining from control messages received from a remote party whether said apparatus is synchronized therewith to generate an identical key.

6. Apparatus according to claim 5, further comprising a resynchronizer, associated with said synchronous state determiner, said resynchronizer having a resynchronization random selector for selecting, from a part of said bitstream previously used by said random selector, a series of bits in accordance with a randomization seeded by said data exchanged between said parties, in the event of determination of synchronization loss, thereby to regain synchronization.

7. Apparatus according to claim 6, wherein said series of bits is a series of bits previously used by said random selector.

8. Apparatus according to claim 5, wherein said control messager is operatively connected to said synchronous state determiner, thereby to include within said control messages a determination of synchronization loss.

9. Apparatus according to claim 6, wherein said control messager is operatively connected with said resynchronizer, to control said resynchronizer to carry out said selection in the event of receipt of a message from said remote party that said remote party has lost synchronization.

10. Apparatus according to claim 1, comprising circuitry for determining which of itself and said remote party is a transmitting party and being operable to control said synchronization when it is a transmitting party and to respond to control commands of said remote party when said remote party is said transmitting party.

11. Apparatus according to claim 5, wherein said synchronized state determiner comprises:
   a calculation circuit for carrying out an irreversible calculation on any one of said bitstream, said randomization, said key and derivations thereof, and
   a comparator for comparing a result of said calculation with a result received from said remote party,
   thereby to determine whether said parties are in synchronization.

12. Apparatus according to claim 11, wherein said irreversible calculation comprises a one-way function.

13. Apparatus according to claim 1, said system being operable to provide key management for a symmetric cryptography algorithm.

14. Apparatus according to claim 13, being constructed modularwise such that said cryptography algorithm is exchangeable.

15. Apparatus for use by a first party for key management for secure communication with a second party, said key management being to provide at each party, simultaneously remotely, identical keys for said secure communication without transferring said keys or components thereof over any communication link, the apparatus comprising:

a datastream extractor, configured to extract a bitstream from data exchanged between said parties;

a random selector configured with selection settings identical to those at said second party said selection settings defining a selection, from said bitstream, of a series of bits in accordance with a randomization within said random selector, said randomization seeded by said data exchanged between said parties, said randomization being identical to a randomization carried out at said second party, thereby ensuring that said series of bits is identically selected at both parties;

a key generator configured for separately generating at said first party a key for encryption/decryption based on said series of bits, thereby to separately generate a key at said first party which is identical to a key likewise generated at said second party based on said exchanged information, thus to manage key generation in a manner repeatable at said parties, without transferring said keys or components thereof over any communication link said data communication being arranged in cycles, said part of said bitstream being exchangeable in each cycle.

16. Apparatus according to claim 15, said cycle being arranged into sub-units, each said cycle having an exchange point at its beginning for carrying out said exchange.

17. Apparatus according to claim 9, said messager being usable to exchange control messages with said remote party to ensure that a same bitstream part is used for resynchronization at both said parties.

18. Apparatus according to claim 16, said messager being usable to vary a control message in accordance with a sub-cycle current at a synchronization loss event, thereby to control said remote party to resynchronize using a same bitstream part.

19. Apparatus according to claim 18, operable to respond to messages sent by a remote party following said synchronization loss event, to revert to same said bitstream part as said message indicates that said remote party intends to use.

20. A system for providing key management between at least two separate parties, the system comprising
a primary bitstream for exchange between said parties,
and at each party:
a selector configured with identical settings, said settings defining a random selection at predetermined selection intervals, of parts of said primary bitstream to form a derived bit source, each selector being operable to use said derived bit source, in an identical manner, to randomize said selecting of parts of said primary bitstream, said identical settings ensuring that each party derives an identical derived bit source, and
a key generator configured for separately generating at each of said separate parties cryptography keys at predetermined key generating intervals using said derived bit source of a corresponding selection interval, said cryptographic keys being identical at each of said separate parties, wherein said bits in said primary bitstream are separately identifiable by an address, and wherein said selector is operable to select said bits by random selection of addresses, and wherein each selector comprises an address generator and each address generator is identically set.

21. A system according to claim 20, wherein said primary bitstream is obtainable as a stream of bits from a data communication process between said two parties.

22. A system according to claim 20, further comprising a controller for exchanging control data between said parties to enable each party to determine that each selector is operating synchronously at each party.

23. A system according to claim 22, wherein said control data includes any one of a group comprising:
redundancy check data, and
a hash encoding result,
of at least some of the bits from said derived bit source.

24. A system according to claim 22, wherein said control data includes any one of a group comprising:
redundancy check data, and
a hash encoding result,
of at least some of the bits of said randomization.

25. A system according to claim 22, wherein said control data includes any one of a group comprising:
redundancy check data, and
a hash encoding result,
of at least some of the bits from said key.

26. A system according to claim 22, wherein said control data includes any one of a group comprising:
redundancy check data of at least some of said addresses, and
a hash encoding result of at least some of said addresses.

27. A system according to claim 22, further comprising at each party a resynchronizer operable to determine from said control data that synchronization has been lost between the parties and to regain synchronization based on a predetermined earlier part of said derived bit source.

28. A system according to claim 21, further comprising at each party a resynchronizer operable to determine from control data exchanged between said parties that synchronization has been lost between said parties and to regain synchronization based on a predetermined earlier part of said derived bit source.

29. A system according to claim 28, said data communication process being arranged in cycles, said predetermined earlier part being exchangeable in each cycle.

30. A system according to claim 29, said cycles being arranged into sub-units, each said cycle having an exchange point at its beginning for carrying out said exchange of said predetermined earlier part of said derived bit source.

31. A system according to claim 27, said controller being usable to include in said control messages, data to ensure that a predetermined earlier part of said derived bit source of a same cycle is used for resynchronization at both said parties.

32. A system according to claim 30, said controller being usable to vary a control message in accordance with a sub-cycle current at a synchronization loss event, thereby to control said remote party to resynchronize using same said predetermined earlier part of said derived bit source.

33. A system according to claim 32, operable to respond to messages sent by a remote party following said synchronization loss event, to revert to same said predetermined earlier part of said derived bit source as said message indicates that said remote party intends to use.

34. A method of key management with at least one remote party, comprising the steps of:
sharing with said remote party a primary data stream,
using said primary data stream and identical settings at each party to form an identical randomizer at each party,
selecting parts of said primary data stream using said identical randomizer at each party to form identical derived data sources independently at each party, and
using said derived data source to form identical cryptography keys separately at different parties at predetermined intervals, wherein said primary data source comprises a stream of data bits divisible into data units and comprising selecting at random from the data bits of each data unit, and said bits in said data units are separately identifiable by addresses, and comprising selecting said bits by using said randomizer as an address pointer.

35. A method according to claim 34, wherein said primary data source is obtainable as a stream of bits from a communication process between said two parties.

36. A method according to claim 34, wherein selecting is carried out by using identically set pseudorandom data generation at each party, and using said derived data source as a seed for said pseudorandom data generation.

37. A method according to claim 34, further comprising exchanging control data between said parties to enable each party to determine whether they are operating synchronously with said other party.

38. A method according to claim 37, wherein said control data includes any one of a group comprising:
   redundancy check data of at least some of said derived data source, and
   a hash encoding result of at least some of said derived data source.

39. A method according to claim 37, comprising determining from said control data that synchronization has been lost between the parties and regaining synchronization based on a predetermined earlier part of said derived data source.

40. A method according to claim 39, further comprising a step of exchanging said predetermined earlier part of said derived data source at predetermined intervals.

41. A method according to claim 40, further comprising steps of:
   determining a possibility of each party being at a different cycle at synchronization loss, and
   controlling said resynchronization to use a same predetermined earlier part of said derived data source at both parties.

42. A method according to claim 34, further comprising creating in advance a future cycle's predetermined earlier part of said derived data source for resynchronizing with a party that has already moved to such a cycle.

43. A method according to claim 34, in use to provide key management for a symmetric cryptography algorithm.

* * * * *